United States Patent
Phuyal et al.

(10) Patent No.: US 11,438,760 B2
(45) Date of Patent: *Sep. 6, 2022

(54) EXCHANGING A MESSAGE INCLUDING AN IN-FLIGHT STATUS INDICATOR BETWEEN A DRONE-COUPLED USER EQUIPMENT AND A COMPONENT OF A TERRESTRIAL WIRELESS COMMUNICATION SUBSCRIBER NETWORK

(71) Applicant: QUALCOMM Incorporated, San Diego, CA (US)

(72) Inventors: Umesh Phuyal, San Diego, CA (US); Alberto Rico Alvarino, San Diego, CA (US); Haris Zisimopoulos, London (GB); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/969,744

(22) Filed: May 2, 2018

(65) Prior Publication Data

US 2018/0324581 A1 Nov. 8, 2018

Related U.S. Application Data

(60) Provisional application No. 62/501,054, filed on May 3, 2017.

(51) Int. Cl.
*H04W 8/24* (2009.01)
*H04W 36/00* (2009.01)
(Continued)

(52) U.S. Cl.
CPC ............ *H04W 8/24* (2013.01); *H04B 7/15* (2013.01); *H04B 7/15507* (2013.01);
(Continued)

(58) Field of Classification Search
CPC ........ B64C 2201/127; B64C 2201/128; B64C 2201/146; B64C 39/024; H04B 7/15;
(Continued)

(56) References Cited

U.S. PATENT DOCUMENTS 9,537,561 B1 1/2017 Kotecha et al.
9,927,807 B1 3/2018 Ganjoo
(Continued)

FOREIGN PATENT DOCUMENTS

| CN | 101543107 A | 9/2009 |
|---|---|---|
| CN | 102037661 A | 4/2011 |

(Continued)

OTHER PUBLICATIONS

Ericsson et al., "Motivation for Study on Enhanced LTE Support for Aerial Vehicles", RP-170157, AI: 10.1.2, RAN #75, Dubrovnik, Croatia, Mar. 6-9, 2017, 8 slides.

(Continued)

*Primary Examiner* — Awet Haile
(74) *Attorney, Agent, or Firm* — Muncy, Geissler, Olds & Lowe, P.C.

(57) ABSTRACT

In an embodiment, a drone-coupled UE determines whether the drone-coupled UE is engaged in a flying state, and transmits a message to a network component of a terrestrial wireless communication subscriber network that indicates a result of the determining. The network component receives the message from the drone-coupled UE. In an embodiment, a network component of a terrestrial wireless communication subscriber network determines whether the drone-coupled UE is engaged in a flying state based on the message from the drone-coupled UE. The network component then applies protocols based on the determining.

28 Claims, 16 Drawing Sheets

(51) Int. Cl.
*H04W 48/16* (2009.01)
*H04B 7/155* (2006.01)
*H04W 48/18* (2009.01)
*H04B 7/15* (2006.01)
*H04W 36/08* (2009.01)
*H04W 36/30* (2009.01)
*H04W 4/02* (2018.01)
*H04W 48/20* (2009.01)
*H04W 36/32* (2009.01)
*H04W 76/10* (2018.01)
*B64C 39/02* (2006.01)

(52) U.S. Cl.
CPC ....... *H04W 36/0083* (2013.01); *H04W 36/08* (2013.01); *H04W 36/30* (2013.01); *H04W 48/16* (2013.01); *H04W 48/18* (2013.01); *B64C 39/024* (2013.01); *B64C 2201/127* (2013.01); *B64C 2201/128* (2013.01); *B64C 2201/146* (2013.01); *H04W 4/02* (2013.01); *H04W 36/32* (2013.01); *H04W 48/20* (2013.01); *H04W 76/10* (2018.02)

(58) Field of Classification Search
CPC .......... H04B 7/15507; H04W 36/0083; H04W 36/08; H04W 36/30; H04W 36/32; H04W 48/16; H04W 48/18; H04W 48/20; H04W 4/02; H04W 76/10; H04W 8/24
See application file for complete search history.

(56) References Cited

U.S. PATENT DOCUMENTS

| 10,127,822 | B2 | 11/2018 | Damnjanovic et al. |
|---|---|---|---|
| 2010/0142482 | A1 | 6/2010 | Lu et al. |
| 2010/0311354 | A1 | 12/2010 | Stayton et al. |
| 2011/0028147 | A1 | 2/2011 | Calderhead, Jr. et al. |
| 2011/0241827 | A1 | 10/2011 | Varoglu |
| 2012/0091260 | A1 | 4/2012 | Callou |
| 2014/0094139 | A1 | 4/2014 | Xu et al. |
| 2014/0219251 | A1 | 8/2014 | Kato |
| 2014/0220973 | A1 | 8/2014 | Lunden et al. |
| 2016/0066252 | A1 | 3/2016 | Parron et al. |
| 2016/0117931 | A1* | 4/2016 | Chan ............... G08G 5/0043 701/120 |
| 2016/0328980 | A1* | 11/2016 | Sharma ............ G08G 5/0013 |
| 2016/0376004 | A1 | 12/2016 | Claridge et al. |
| 2017/0233097 | A1 | 8/2017 | Chang |
| 2017/0242431 | A1 | 8/2017 | Dowlatkhah et al. |
| 2017/0316510 | A1 | 11/2017 | Hertz et al. |
| 2017/0355457 | A1* | 12/2017 | Terry ................. G08G 5/0034 |
| 2018/0025649 | A1 | 1/2018 | Contreras et al. |
| 2018/0059659 | A1 | 3/2018 | Takeuchi et al. |
| 2018/0152870 | A1 | 5/2018 | Park |
| 2018/0204469 | A1 | 7/2018 | Moster et al. |
| 2018/0222582 | A1* | 8/2018 | Ohata ....................... B64F 1/36 |
| 2018/0247544 | A1 | 8/2018 | Mustafic et al. |
| 2018/0257762 | A1 | 9/2018 | Colonna et al. |
| 2018/0270710 | A1 | 9/2018 | Hua et al. |
| 2018/0294871 | A1 | 10/2018 | Kosseifi et al. |
| 2018/0324580 | A1 | 11/2018 | Phuyal et al. |
| 2018/0324662 | A1 | 11/2018 | Phuyal et al. |
| 2018/0336789 | A1 | 11/2018 | Damnjanovic et al. |
| 2019/0019418 | A1 | 1/2019 | Tantardini et al. |
| 2019/0077508 | A1* | 3/2019 | Shimezawa ........... B64D 45/00 |
| 2019/0260462 | A1 | 8/2019 | Axmon et al. |
| 2021/0144611 | A1 | 5/2021 | Wigard et al. |

FOREIGN PATENT DOCUMENTS

| CN | 103576690 | A | 2/2014 |
|---|---|---|---|
| CN | 203773355 | U | 8/2014 |
| CN | 104170442 | A | 11/2014 |
| CN | 104487962 | A | 4/2015 |
| CN | 104932527 | A | 9/2015 |
| CN | 105070017 | A | 11/2015 |
| CN | 105739520 | A | 7/2016 |
| CN | 105739536 | A | 7/2016 |
| CN | 105744636 | A | 7/2016 |
| CN | 105892472 | A | 8/2016 |
| CN | 106054914 | A | 10/2016 |
| CN | 106054926 | A | 10/2016 |
| CN | 106168807 | A | 11/2016 |
| CN | 106211077 | A | 12/2016 |
| CN | 111866970 | A | 10/2020 |
| WO | 2016108220 | A1 | 7/2016 |
| WO | 2016133247 | A1 | 8/2016 |
| WO | 2017024005 | A1 | 2/2017 |
| WO | 2017042403 | A1 | 3/2017 |
| WO | 2017050500 | A1 | 3/2017 |

OTHER PUBLICATIONS

"Flying an Unmanned Aircraft? Find Out If You Need Permission From Transport Canada", retrieved on Mar. 6, 2018, 1 page.
International Search Report and Written Opinion—PCT/US2018/030877—ISA/EPO—dated Aug. 23, 2018.
NTT Docomo Inc et al., "New SID on Enhanced Support for Aerial Vehicles", RP-170779, AI: 10.1.2, 3GPP TSG RAN Meeting #75, Dubrovnik, Croatia, Mar. 6-9, 2017, 4 pages.
Taiwan Search Report—TW107115055—TIPO—dated Jul. 22, 2021.

* cited by examiner

EXCHANGING A MESSAGE INCLUDING AN IN-FLIGHT STATUS INDICATOR BETWEEN A DRONE-COUPLED USER EQUIPMENT AND A COMPONENT OF A TERRESTRIAL WIRELESS COMMUNICATION SUBSCRIBER NETWORK

CROSS-REFERENCE TO RELATED APPLICATION

The present application for patent claims the benefit of U.S. Provisional Application No. 62/501,054, entitled "MANAGING DRONE-COUPLED USER EQUIPMENTS", filed May 3, 2017, assigned to the assignee hereof and hereby expressly incorporated by reference herein in its entirety.

BACKGROUND

1. Field of the Disclosure

Embodiments relate to exchanging a message including a message including an in-flight status indicator between a drone-coupled user equipment and a component of a terrestrial wireless communication subscriber network.

2. Description of the Related Art

User equipments (UEs), such as phones, tablet computers, desktop computers or laptop computers, are generally configured to connect to terrestrial wireless communication subscriber networks (e.g., 3G, 4G, 5G LTE, 5G New Radio (NR), etc.) with the expectation that the UEs are not airborne. For example, users are typically asked to place their respective UEs into "airplane" mode between takeoff and landing for commercial flights, which restricts the UEs' capability for connecting to terrestrial wireless communication subscriber networks.

For most manned (or piloted) aerial vehicles, typical cruising altitudes and/or speeds make connections to terrestrial wireless communication subscriber networks impractical. For example, commercial aircraft may reach cruising altitudes near 12 km at speeds between 800-1000 km/hr. Instead of relying upon terrestrial wireless communication subscriber networks to support communications for/with manned aerial vehicles such as commercial aircraft, most countries allocate a portion of Very High Frequency (VHF) radio spectrum to define an Airband or Aircraft band that is dedicated to radio-navigational communications and/or air traffic control communications.

Regulatory agencies are increasingly authorizing deployment of unmanned aerial vehicles (UAVs), such as commercial drones. Commercial drones are being considered to provide a variety of services, such as package delivery, search-and-rescue, monitoring of critical infrastructure, wildlife conservation, flying cameras, surveillance, and so on. Commercial drones may operate at altitudes and speeds that are more suitable for connections to terrestrial wireless communication subscriber networks. For example, in certain environments, commercial drones may operate at cruising altitudes near 100 m at speeds up to or near 160 km/h. However, uplink signals from commercial drones that are in-flight generally create more interference to terrestrial base stations compared to "grounded" UEs in a non-flying state.

SUMMARY

An embodiment is directed to a method of operating a drone-coupled user equipment (UE), comprising determining whether the drone-coupled UE is engaged in a flying state, and transmitting a message to a network component of a terrestrial wireless communication subscriber network that indicates a result of the determining.

Another embodiment is directed to a method of operating a network component of a terrestrial wireless communication subscriber network, comprising receiving a message from a drone-coupled user equipment (UE) that indicates whether the drone-coupled UE is engaged in a flying state.

Another embodiment is directed to a drone-coupled user equipment (UE), comprising at least one processor coupled to a memory and a wireless communications interface and configured to determine whether the drone-coupled UE is engaged in a flying state, and transmit a message to a network component of a terrestrial wireless communication subscriber network that indicates a result of the determining.

Another embodiment is directed to a network component of a terrestrial wireless communication subscriber network, comprising at least one processor coupled to a memory and at least one communications interface and configured to receive a message from a drone-coupled user equipment (UE) that indicates whether the drone-coupled UE is engaged in a flying state.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
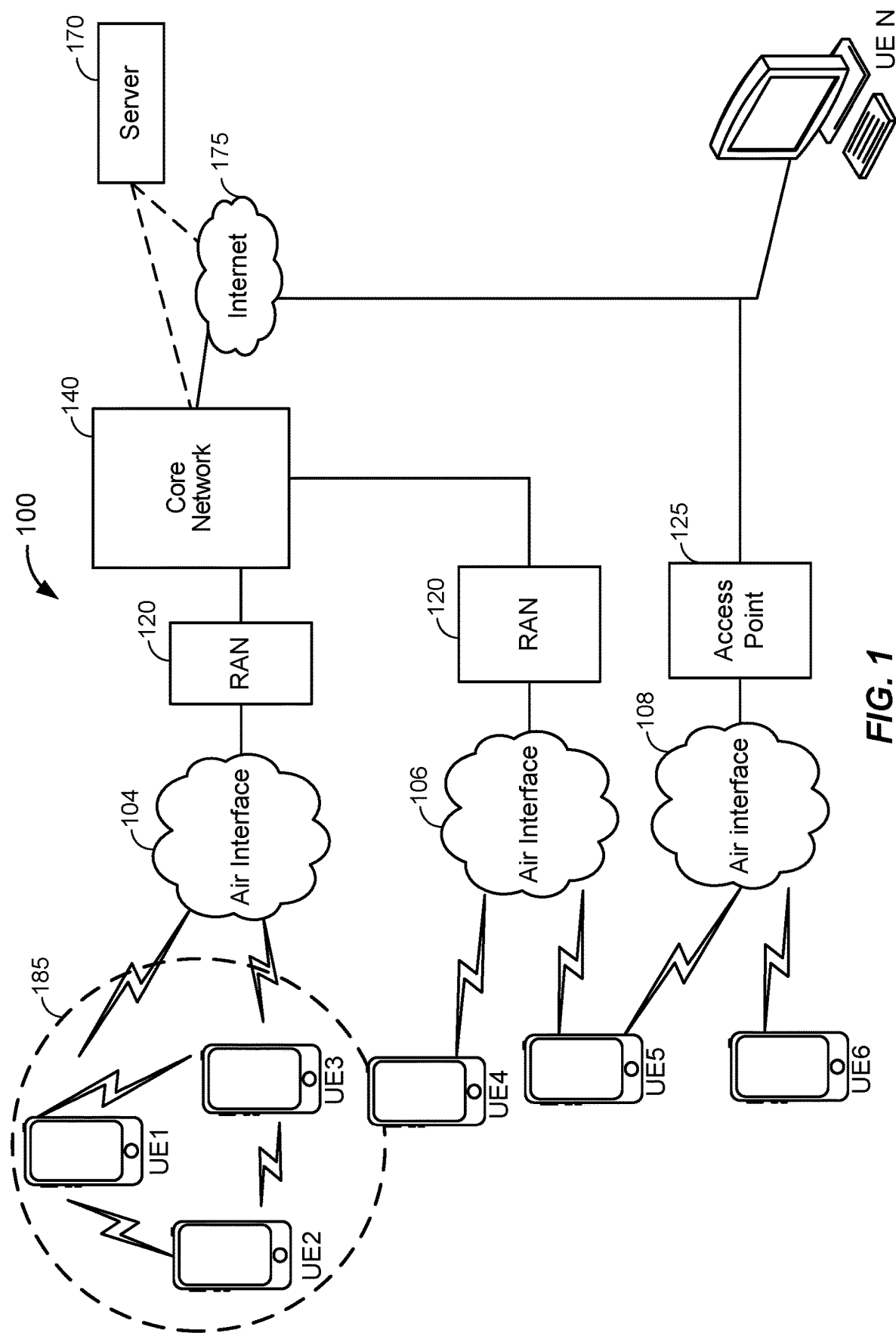
FIG. 1 illustrates a high-level system architecture of a wireless communications system in accordance with an embodiment of the disclosure.

Embodiments of the disclosure relate to various methodologies for managing drone-coupled user equipments (UEs).

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a peer-to-peer (P2P) or device-to-device (D2D) channel.

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 3 are illustrated as cellular calling phones, UEs 1 . . . 6 are illustrated as cellular touchscreen phones or smart phones, and UE N is illustrated as a desktop computer or PC.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, 4G LTE, 5G LTE, 5G New Radio (NR), etc.), while the air interface 108 can comply with a wireless IP protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNBs, gNBs, and so on. These access points can be terrestrial access points (or ground stations), or satellite access points. The RAN 120 may be configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. As used herein, the RAN 120, the core network 140 or a combination thereof may be referred to as a terrestrial wireless communication subscriber network.

The Internet 175, in some examples includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 5 or UE 6 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. The server 170 may correspond to any type of server, such as a web server (e.g., hosting a web page), an application download server, or an application server that supports particular communicative service(s) such as IP Multimedia Subsystem (IMS) service, such as Voice-over-Internet Protocol (VoIP) sessions, Push-to-Talk (PTT) sessions, group communication sessions, social networking services, etc.

Referring to FIG. 1, UEs 1 . . . 3 are depicted as part of a D2D network or D2D group 185, with UEs 1 and 3 being connected to the RAN 120 via the air interface 104. In an embodiment, UE 2 may also gain indirect access to the RAN 120 via mediation by UEs 1 and/or 3, whereby data 'hops' to/from UE 2 and one (or more) of UEs 1 and 3, which communicate with the RAN 120 on behalf of UE 2.

Figure 2A:
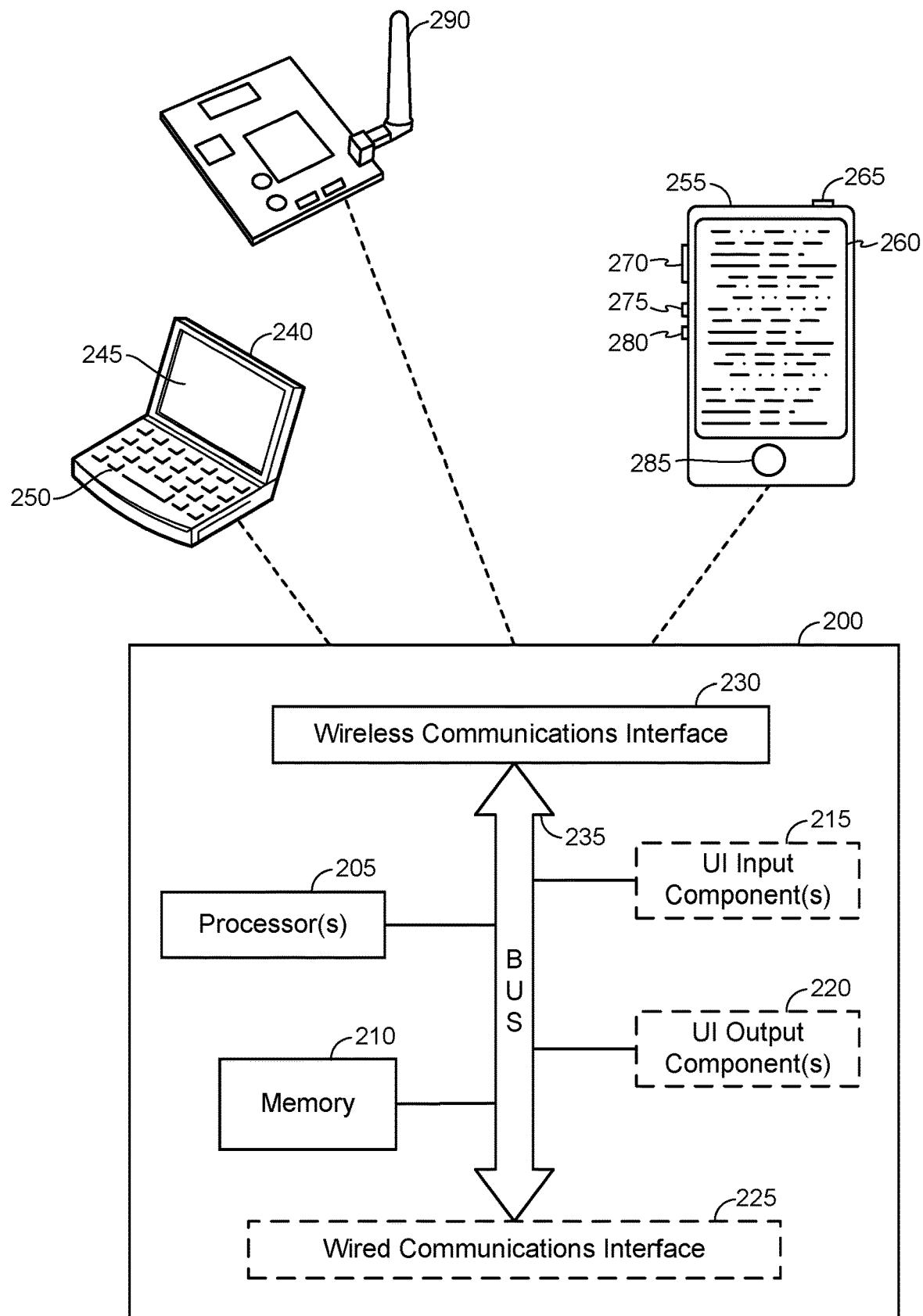
FIG. 2A illustrates a user equipment (UE) in accordance with an embodiment of the disclosure.

FIG. 2A illustrates a UE 200 in accordance with an embodiment of the disclosure. The UE 200 includes one or more processors 205 (e.g., one or more ASICs, one or more digital signal processors (DSPs), etc.) and a memory 210 (e.g., RAM, ROM, EEPROM, flash cards, or any memory common to computer platforms). The UE 200 also optionally includes one or more UI input components 215 (e.g., a keyboard and mouse, a touchscreen, a microphone, one or more buttons such as volume or power buttons, etc.) and one or more UI output components 220 (e.g., speakers, a display screen, a vibration device for vibrating the UE 200, etc.). In an example, the UI input components 215 and UI output components 220 are optional because the UE 200 need not interface with a local user in all implementations. For example, if the UE 200 is implemented as a wireless communications component of a commercial drone, the UE 200 may be interfaced with via remote connections instead of a local UI interface.

The UE 200 further includes a wired communications interface 225 and a wireless communications interface 230. In an example, the wired communications interface 225 may be optional (e.g., commercial drones may be configured for wireless communication only). In an example embodiment, if made part of the UE 200, the wired communications interface 225 can be used to support wired local connections to peripheral devices (e.g., a USB connection, a mini USB or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless communications interface 230 includes one or more wireless transceivers for communication in accordance with a local wireless communications protocol (e.g., WLAN or WiFi, WiFi Direct, Bluetooth, etc.) and/or one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, LTE, 4G, 5G LTE, 5G NR or other protocols that may be used in a terrestrial wireless communication subscriber network). The various components 205-230 of the UE 200 can communicate with each other via a bus 235.

Referring to FIG. 2A, the UE 200 may correspond to any type of UE, including but not limited to a smart phone, a laptop computer, a desktop computer, a tablet computer, a wearable device (e.g., a pedometer, a smart watch, etc.), a communications component of a larger device (e.g., a cellular module integrated into a commercial drone), and so on. Three particular implementation examples of the UE 200 are depicted in FIG. 2A, which are illustrated as laptop 240, touchscreen device 255 (e.g., a smart phone, a tablet computer, etc.) and terrestrial wireless communication subscriber network (e.g., cellular) module 290. The laptop 240 includes a display screen 245 and a UI area 250 (e.g., keyboard, touchpad, power button, etc.), and while not shown the laptop 240 may include various ports as well as wired and/or wireless transceivers (e.g., Ethernet card, WiFi card, broadband card, etc.).

The touchscreen device 255 is configured with a touchscreen display 260, peripheral buttons 265, 270, 275 and 280 (e.g., a power control button, a volume or vibrate control button, an airplane mode toggle button, etc.), and at least one front-panel button 285 (e.g., a Home button, etc.), among other components, as is known in the art. While not shown explicitly as part of the touchscreen device 255, the touchscreen device 255 can include one or more external antennas and/or one or more integrated antennas that are built into the external casing of the touchscreen device 255, including but not limited to WiFi antennas, cellular antennas, satellite position system (SPS) antennas (e.g., global positioning system (GPS) antennas), and so on.

The terrestrial wireless communication subscriber network (e.g., cellular) module 290 is illustrated in FIG. 2A as a circuit coupled to a radio antenna. The terrestrial wireless communication subscriber network (e.g., cellular) module 290 may be integrated into a larger structure, such as a commercial drone, with the terrestrial wireless communication subscriber network (e.g., cellular) module 290 representing the UE (or communicative) component of the larger structure.

Figure 2B:
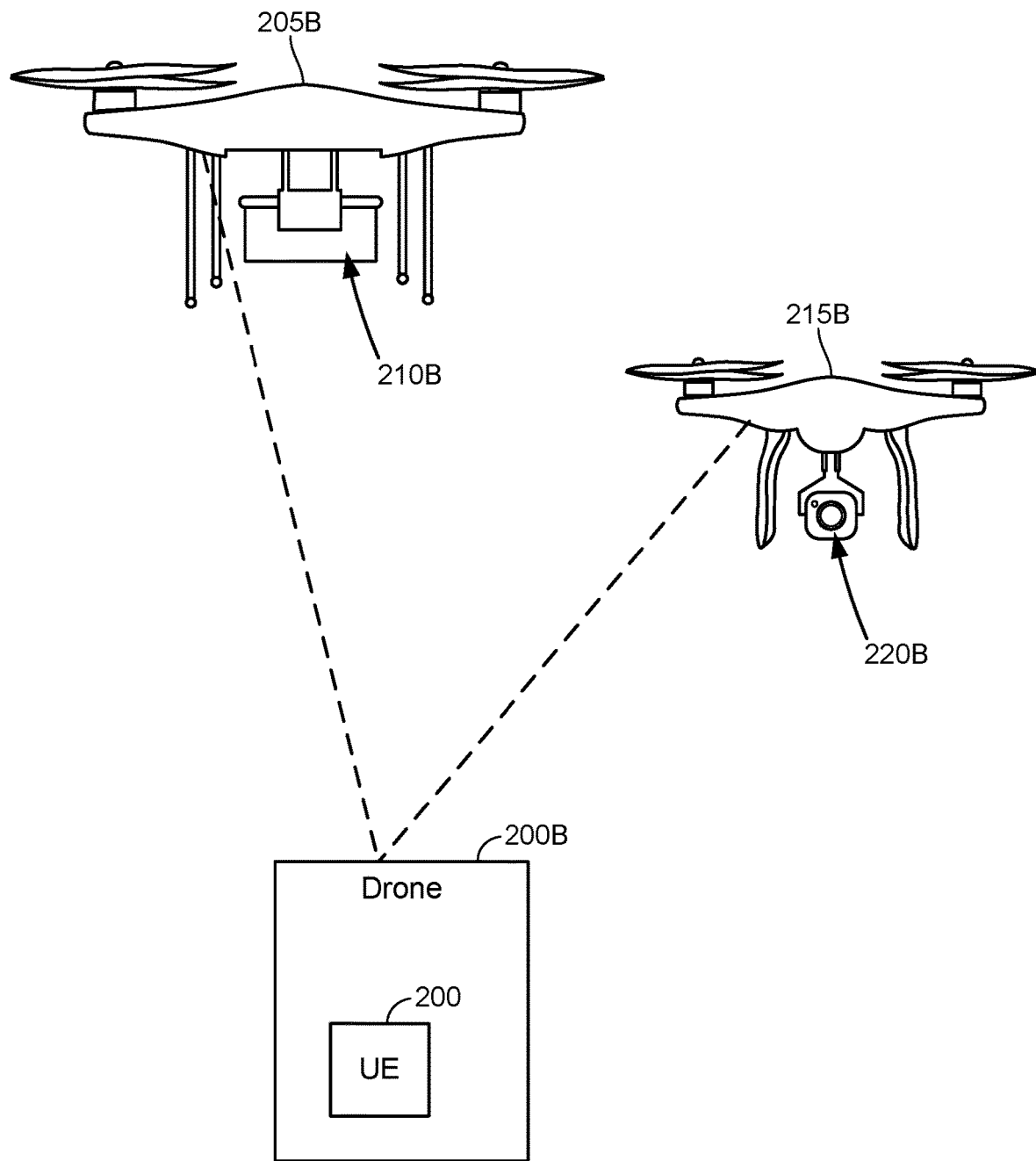
FIG. 2B illustrates the UE of FIG. 2A deployed within a drone in accordance with an embodiment of the disclosure.

FIG. 2B illustrates a drone 200B in accordance with an embodiment of the disclosure. The drone 200B, which may be a commercial drone that is licensed for at least some level of in-flight access to one or more terrestrial wireless communication subscriber networks, includes various flying hardware and flying control components (not shown), and is coupled to the UE 200. The UE 200 in FIG. 2B may thereby alternatively be referred to as a drone-coupled UE. In one example, the UE 200 functions as a wireless communications component of the drone 200B through which the drone 200B can establish a connection with the one or more terrestrial wireless communication subscriber networks for which in-flight access is authorized. In a further example, the UE 200 in the drone 200B can be integrated with the flying control components of the drone 200B in at least one embodiment (e.g., the processor(s) 205 and/or memory 210 may support both the communications functionality of the UE 200 as well as flying control).

Alternatively, the UE 200 may be coupled to the drone 200B physically but not communicatively. For example, a user may simply duct-tape the UE 200 to the drone 200B so that the UE 200 may record and stream video while the drone 200B is flown and controlled completely independently from the UE 200. Hence, depending on how the UE 200 and drone 200B are configured, the UE 200 may be a drone-coupled UE in a physical sense, a communicative sense, or both. Further, a physical coupling between the UE 200 and the drone 200B may be semi-permanent (e.g., the UE 200 is an integrated physical component installed into the drone 200B, such as the terrestrial wireless communication subscriber network module 290), or temporary (e.g., a user ties or tapes the UE 200 onto the drone 200B).

Moreover, as will be described below in more detail, the UE 200 may be configured to access the one or more terrestrial wireless communication subscriber networks while the drone 200B is in-flight, or alternatively when the drone 200B is not in-flight (i.e., grounded). In FIG. 2B, two example implementations of the drone 200B are shown. In particular, a package-delivery drone 205B is shown carrying a package 210B, and a surveillance drone 215B is shown with an attached camera 220B.

Figure 3:
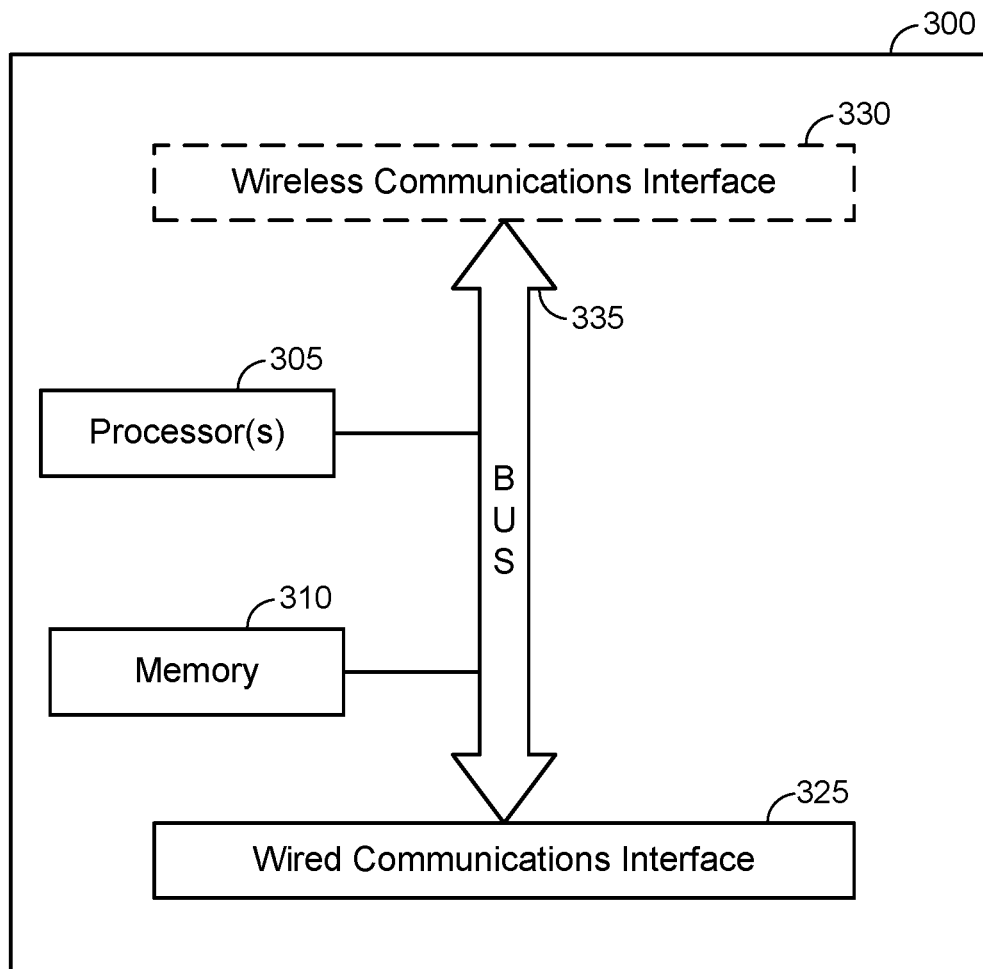
FIG. 3 illustrates a network component in accordance with an embodiment of the disclosure.

FIG. 3 illustrates a network component 300 of a terrestrial wireless communication subscriber network in accordance with an embodiment of the disclosure. The network component 300 may be a component of the RAN 120 (e.g., a base station, Node B, eNB, gNB, etc.), or alternatively may be a core network component of the terrestrial wireless communication subscriber network (e.g., a Mobility Management Entity (MME) of an LTE core network, etc.). The network component 300 includes one or more processors 305 (e.g., one or more ASICs, one or more DSPs, etc.) and a memory 310 (e.g., RAM, ROM, EEPROM, flash cards, or any memory common to computer platforms). The network component 300 further includes a wired communications interface 325 and (optionally) a wireless communications interface 330. In an example, the wireless communications interface 330 may be optional if the network component 300 is implemented as a core network component, which is essentially a network server. The various components 305-330 of the network component 300 can communicate with each other via a bus 335. In an example embodiment, the wired communications interface 325 can be used to connect to one or more backhaul components.

In another example embodiment, the wireless communications interface 330 (if made part of the network component 300) includes one or more wireless transceivers for communication in accordance with a wireless communications protocol. The wireless communications protocol may be based on the configuration of the network component 300. For example, if the network component 300 corresponds to an access point that is implemented as a macro cell or a small cell (e.g., a femto cell, a pico cell, etc.), the wireless communications interface 330 may include one or more wireless transceivers configured to implement a cellular protocol (e.g., CDMA, W-CDMA, GSM, 3G, 4G, 5G LTE, 5G NR, etc.). In another example, if the network component 300 is implemented as a WiFi AP (e.g., part of a WLAN, an Internet of Things (IoT) network, etc.), the wireless communications interface 330 may include one or more wireless transceivers configured to implement a WiFi (or 802.11) protocol (e.g., 802.11a, 802.11b, 802.11g, 802.11n, 802.11ax, etc.).

Figure 4:
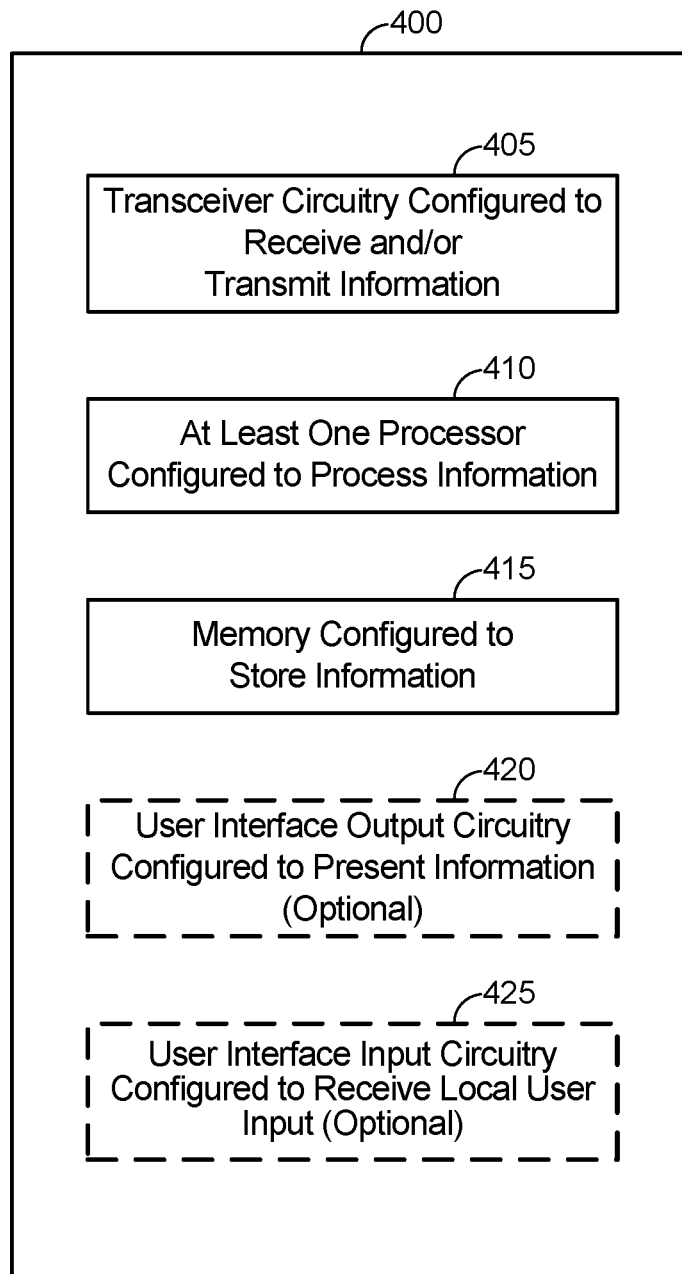
FIG. 4 illustrates a communications device that includes structural components in accordance with an embodiment of the disclosure.

FIG. 4 illustrates a communications device 400 that includes structural components in accordance with an embodiment of the disclosure. The communications device 400 can correspond to any of the above-noted communications devices, including but not limited to UE 200 or network component 300, any component included in the RAN 120 such as base stations, access points, eNBs, gNBs, BSCs or RNCs, any component of the core network 140, any component coupled to the Internet 175 (e.g., the server 170), and so on. Thus, communications device 400 can correspond to any electronic device that is configured to communicate with (or facilitate communication with) one or more other entities over the wireless communications system 100 of FIG. 1.

Referring to FIG. 4, the communications device 400 includes transceiver circuitry configured to receive and/or transmit information 405. In an example, if the communications device 400 corresponds to a wireless communications device (e.g., UE 200), the transceiver circuitry configured to receive and/or transmit information 405 can include a wireless communications interface (e.g., LTE, 5G NR, Bluetooth, WiFi, WiFi Direct, LTE-Direct, etc.) such as a wireless transceiver and associated hardware (e.g., an RF antenna, a MODEM, a modulator and/or demodulator, etc.). In another example, the transceiver circuitry configured to receive and/or transmit information 405 can correspond to a wired communications interface (e.g., a serial connection, a USB or Firewire connection, an Ethernet connection through which the Internet 175 can be accessed, etc.). Thus, if the communications device 400 corresponds to some type of network-based server (e.g., the server 170), the transceiver circuitry configured to receive and/or transmit information 405 can correspond to an Ethernet card, in an example, that connects the network-based server to other communication entities via an Ethernet protocol. In a further example, the transceiver circuitry configured to receive and/or transmit information 405 can include sensory or measurement hardware by which the communications device 400 can monitor its local environment (e.g., an accelerometer, a temperature sensor, a light sensor, an antenna for monitoring local RF signals, etc.). The transceiver circuitry configured to receive and/or transmit information 405 can also include software that, when executed, permits the associated hardware of the transceiver circuitry configured to receive and/or transmit information 405 to perform its reception and/or transmission function(s). However, the transceiver circuitry configured to receive and/or transmit information 405 does not correspond to software alone, and the transceiver circuitry configured to receive and/or transmit information 405 relies at least in part upon structural hardware to achieve its functionality. Moreover, the transceiver circuitry configured to receive and/or transmit information 405 may be implicated by language other than "receive" and "transmit", so long as the underlying function corresponds to a receive or transmit function. For example, functions such as obtaining, acquiring, retrieving, measuring, etc., may be performed by the transceiver circuitry configured to receive and/or transmit information 405 in certain contexts as being specific types of receive functions. In another example, functions such as sending, delivering, conveying, forwarding, etc., may be performed by the transceiver circuitry configured to receive and/or transmit information 405 in certain contexts as being specific types of transmit functions. Other functions that correspond to other types of receive and/or transmit functions may also be performed by the transceiver circuitry configured to receive and/or transmit information 405.

Referring to FIG. 4, the communications device 400 further includes at least one processor configured to process information 410. Example implementations of the type of processing that can be performed by the at least one processor configured to process information 410 includes but is not limited to performing determinations, establishing connections, making selections between different information options, performing evaluations related to data, interacting with sensors coupled to the communications device 400 to perform measurement operations, converting information from one format to another (e.g., between different protocols such as .wmv to .avi, etc.), and so on. For example, the at least one processor configured to process information 410 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 410 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 410 can also include software that, when executed, permits the associated hardware of the at least one processor configured to process information 410 to perform its processing function(s). However, the at least one processor configured to process information 410 does not correspond to software alone, and the at least one processor configured to process information 410 relies at least in part upon structural hardware to achieve its functionality. Moreover, the at least one processor configured to process information 410 may be implicated by language other than "processing", so long as the underlying function corresponds to a processing function. For example, functions such as evaluating, determining, calculating, identifying, etc., may be performed by the at least one processor configured to process information 410 in certain contexts as being specific types of processing functions. Other functions that correspond to other types of processing functions may also be performed by the at least one processor configured to process information 410.

Referring to FIG. 4, the communications device 400 further includes memory configured to store information 415. In an example, the memory configured to store information 415 can include at least a non-transitory memory and associated hardware (e.g., a memory controller, etc.). For example, the non-transitory memory included in the memory configured to store information 415 can correspond to RAM, flash memory, ROM, erasable programmable ROM (EPROM), EEPROM, registers, hard disk, a removable disk, a CD-ROM, or any other form of storage medium known in the art. The memory configured to store information 415 can also include software that, when executed, permits the associated hardware of the memory configured to store information 415 to perform its storage function(s). However, the memory configured to store information 415 does not correspond to software alone, and the memory configured to store information 415 relies at least in part upon structural hardware to achieve its functionality. Moreover, the memory configured to store information 415 may be implicated by language other than "storing", so long as the underlying function corresponds to a storing function. For example, functions such as caching, maintaining, etc., may be performed by the memory configured to store information 415 in certain contexts as being specific types of storing functions. Other functions that correspond to other types of storing functions may also be performed by the memory configured to store information 415.

Referring to FIG. 4, the communications device 400 further optionally includes user interface output circuitry configured to present information 420. In an example, the user interface output circuitry configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 400. For example, if the communications device 400 corresponds to the laptop 240 or touchscreen device 255 as shown in FIG. 2A, the user interface output circuitry configured to present information 420 can include a display such as display screen 245 or touchscreen display 260. In a further example, the user interface output circuitry configured to present information 420 can be omitted for certain communications devices, such as certain UEs (e.g., terrestrial wireless communication subscriber network module 290) and/or network communications devices that do not have a local user (e.g., network switches or routers, remote servers, etc.). The user interface output circuitry configured to present information 420 can also include software that, when executed, permits the associated hardware of the user interface output circuitry configured to present information 420 to perform its presentation function(s). However, the user interface output circuitry configured to present information 420 does not correspond to software alone, and the user interface output circuitry configured to present information 420 relies at least in part upon structural hardware to achieve its functionality. Moreover, the user interface output circuitry configured to present information 420 may be implicated by language other than "presenting", so long as the underlying function corresponds to a presenting function. For example, functions such as displaying, outputting, prompting, conveying, etc., may be performed by the user interface output circuitry configured to present information 420 in certain contexts as being specific types of presenting functions. Other functions that correspond to other types of presenting functions may also be performed by the user interface output circuitry configured to present information 420.

Referring to FIG. 4, the communications device 400 further optionally includes user interface input circuitry configured to receive local user input 425. In an example, the user interface input circuitry configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 400. For example, if the communications device 400 corresponds to laptop 240 or touchscreen device 255 as shown in FIG. 2A, the user interface input circuitry configured to receive local UI area 250 or touchscreen display 260, etc. In a further example, the user interface input circuitry configured to receive local user input 425 can be omitted for certain communications devices, such as certain UEs (e.g., terrestrial wireless communication subscriber network module 290) and/or network communications devices that do not have a local user (e.g., network switches or routers, remote servers, etc.). The user interface input circuitry configured to receive local user input 425 can also include software that, when executed, permits the associated hardware of the user interface input circuitry configured to receive local user input 425 to perform its input reception function(s). However, the user interface input circuitry configured to receive local user input 425 does not correspond to software alone, and the user interface input circuitry configured to receive local user input 425 relies at least in part upon structural hardware to achieve its functionality. Moreover, the user interface input circuitry configured to receive local user input 425 may be implicated by language other than "receiving local user input", so long as the underlying function corresponds to a receiving local user function. For example, functions such as obtaining, receiving, collecting, etc., may be performed by the user interface input circuitry configured to receive local user input 425 in certain contexts as being specific types of receiving local user functions. Other functions that correspond to other types of receiving local user input functions may also be performed by the user interface input circuitry configured to receive local user input 425.

Referring to FIG. 4, while the configured structural components of 405 through 425 are shown as separate or distinct blocks in FIG. 4 that are implicitly coupled to each other via an associated communication bus (not shown expressly), it will be appreciated that the hardware and/or software by which the respective configured structural components of 405 through 425 performs their respective functionality can overlap in part. For example, any software used to facilitate the functionality of the configured structural components of 405 through 425 can be stored in the non-transitory memory associated with the memory configured to store information 415, such that the configured structural components of 405 through 425 each performs their respective functionality (i.e., in this case, software execution) based in part upon the operation of software stored by the memory configured to store information 415. Likewise, hardware that is directly associated with one of the configured structural components of 405 through 425 can be borrowed or used by other of the configured structural components of 405 through 425 from time to time. For example, the at least one processor configured to process information 410 can format data into an appropriate format before being transmitted by the transceiver circuitry configured to receive and/or transmit information 405, such that the transceiver circuitry configured to receive and/or transmit information 405 performs its functionality (i.e., in this case, transmission of data) based in part upon the operation of structural hardware associated with the at least one processor configured to process information 410.

Figure 5:
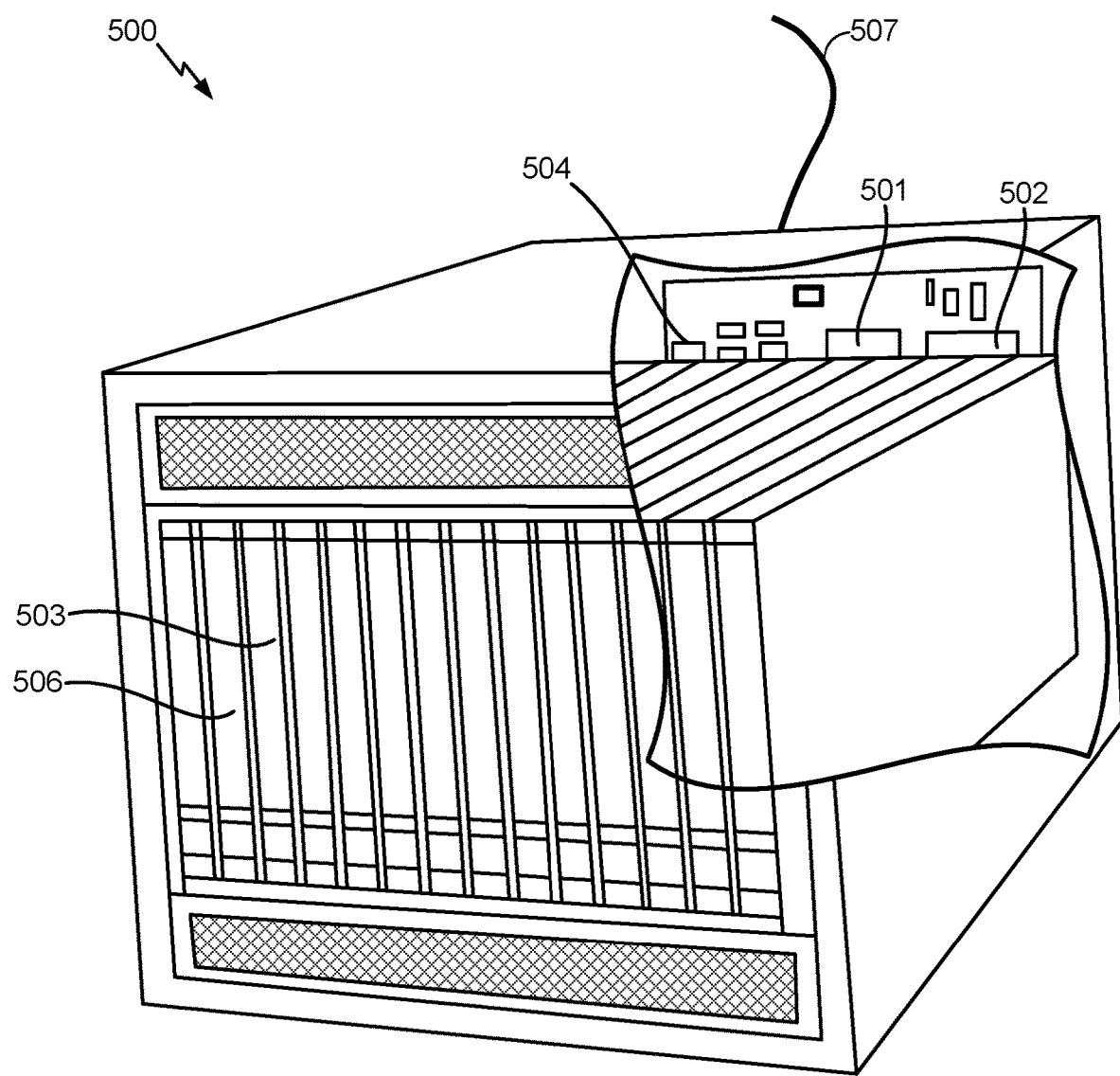
FIG. 5 illustrates a server in accordance with an embodiment of the disclosure.

The various embodiments may be implemented on any of a variety of commercially available server devices, such as server 500 illustrated in FIG. 5. In an example, the server 500 may correspond to one example configuration of the server 170 or the network component 300 (e.g., if implemented as a core network component) as described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communications device 400, whereby the transceiver circuitry configured to transmit and/or receive information 405 corresponds to the network access ports 504 used by the server 500 to communicate with the network 507, the at least one processor configured to process information 410 corresponds to the processor 501, and the memory configuration to store information 415 corresponds to any combination of the volatile memory 502, the disk drive 503 and/or the disc drive 506. The optional user interface output circuitry configured to present information 420 and the optional user interface input circuitry configured to receive local user input 425 are not shown explicitly in FIG. 5 and may or may not be included therein. Thus, FIG. 5 helps to demonstrate that the communications device 400 may be implemented as a server, in addition to a UE as in FIGS. 2A-2B or an access point as in one example implementation of the network component 300.

UEs such as phones, tablet computers, desktop computers or laptop computers, are generally configured to connect to terrestrial wireless communication subscriber networks (e.g., 3G, 4G, 5G, etc.) with the expectation that the UEs are not airborne. For example, users are typically asked to place their respective UEs into "airplane" mode between takeoff and landing for commercial flights, which restricts the UEs' capability for connecting to terrestrial wireless communication subscriber networks.

For most manned (or piloted) aerial vehicles, typical cruising altitudes and/or speeds make connections to terrestrial wireless communication subscriber networks impractical. For example, commercial aircraft may reach cruising altitudes near 12 km at speeds between 800-1000 km/hr. Instead of relying upon terrestrial wireless communication subscriber networks to support communications for/with manned aerial vehicles such as commercial aircraft, most countries allocate a portion of Very High Frequency (VHF) radio spectrum to define an Airband or Aircraft band that is dedicated to radio-navigational communications and/or air traffic control communications.

Regulatory agencies are increasingly authorizing deployment of unmanned aerial vehicles (UAVs), such as commercial drones. Commercial drones are being considered to provide a variety of services, such as package delivery, search-and-rescue, monitoring of critical infrastructure, wildlife conservation, flying cameras, surveillance, and so on. Commercial drones may operate at altitudes and speeds that are more suitable for connections to terrestrial wireless communication subscriber networks. For example, in certain environments, commercial drones may operate at cruising altitudes near 100 m at speeds up to or near 160 km/h. However, uplink signals from commercial drones that are in-flight generally create more interference to terrestrial base stations compared to "grounded" UEs in a non-flying state, as shown in FIG. 6.

Figure 6:
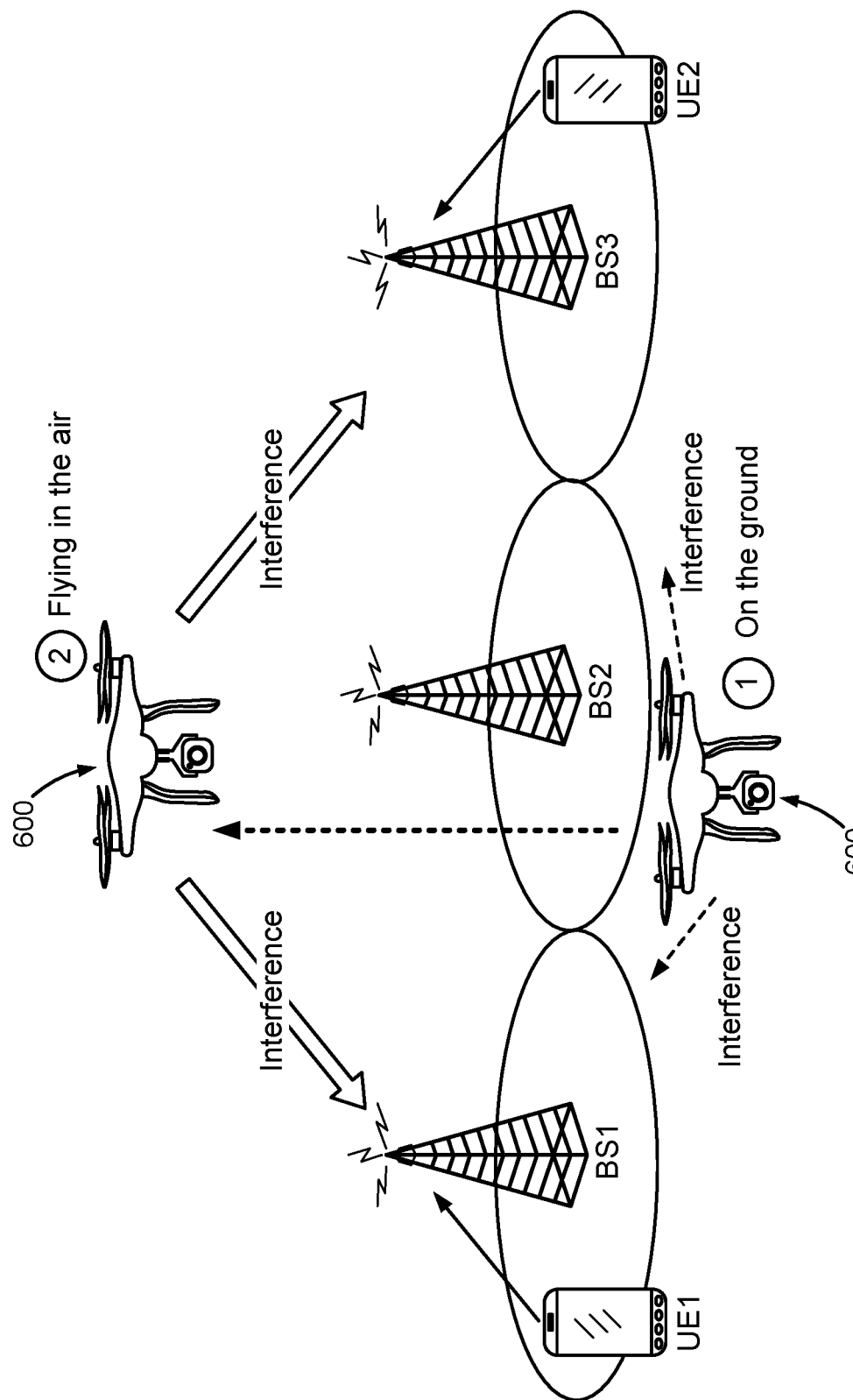
FIG. 6 illustrates interference caused by uplink signals from commercial drones that are in-flight relative to "grounded" UEs in a non-flying state.

Referring to FIG. 6, a drone 600 is shown at a grounded position, denoted as position 1, and then at an airborne or in-flight position, denoted as position 2. Three base stations (BS1, BS2, BS3) are depicted in FIG. 6. Assume that the drone 600 includes a UE that is attached to (e.g., camped on) BS 2, while UE 1 is attached (e.g., camped on) to BS 1 and UE 2 is attached (e.g., camped on) to BS 3. At position 1 on the ground, the drone's 600 uplink signals to BS 2 cause a first level of interference with respect to BS 1 and BS 3. At position 2 in the air, however, the drone's 600 uplink signals to BS 2 cause a second level of interference with respect to BS 1 and BS 3 that is higher than the first level of interference. For example, there are less obstructions between the drone 600 and BS 1 and BS 2 at position 2, which is one reason why the interference upon BS 1 and BS 3 is higher when the drone 600 is at position 2.

For some drones (e.g., such as authorized commercial drones), the higher interference caused by the drone 600 at position 2 is a tradeoff that is deemed acceptable so as to provide the drone 600 with connectivity while in-flight. However, some drones (e.g., unauthorized end-user consumer devices) may not be authorized to connect to one or more terrestrial wireless communication subscriber networks while in-flight, as shown in FIG. 7.

Figure 7:
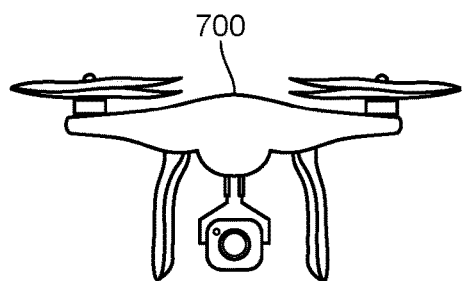
FIG. 7 illustrates an authorized commercial drone and an unauthorized drone.
Figure 7:
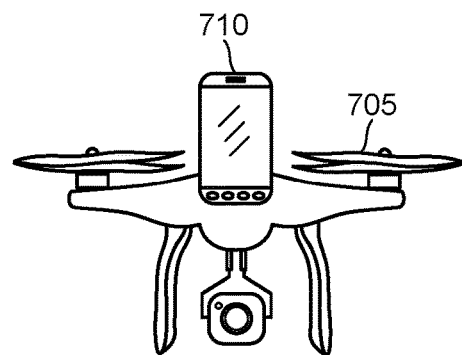
Figure 7:
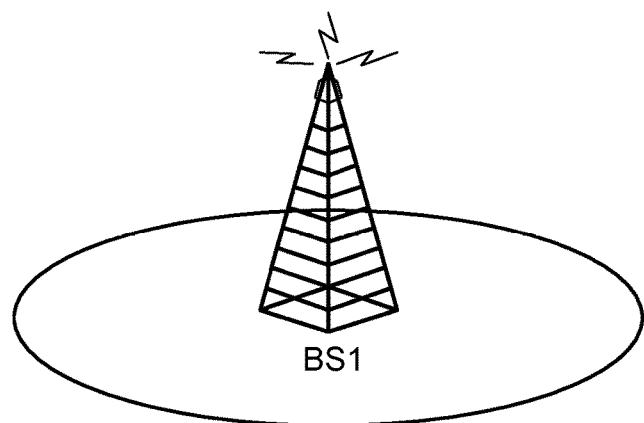

Referring to FIG. 7, assume that drone 700 is a commercial drone that is authorized to access a terrestrial wireless communication subscriber network while in-flight, and is thereby attached to (e.g., camped on) BS 1. In an example, the drone 700 may include an integrated terrestrial wireless communication subscriber network module 290 to facilitate its connection to BS 1. However, assume that drone 705 is an off-the-shelf consumer product that is configured for direct line-of-sight (LOS) control by a respective user. However, this user has modified the drone 705 by attaching a UE 710. Via a wireless connection to the UE 710 over BS 1, the user of the drone 705 wants to either control the drone 705 (e.g., extend the range of the drone 705, etc.) or implement some other action (e.g., take pictures or record video using UE 710). The wireless connection between UE 710 and BS 1 while UE 710 is in-flight may be deemed undesirable and unauthorized for certain terrestrial wireless communication subscriber networks, either from a regulatory standpoint (e.g., against governmental regulations) or against operator preference (e.g., the operator of the terrestrial wireless communication subscriber network charges a premium for in-flight drone connectivity service, and the user of UE 710 does not subscribe to this premium service).

Accordingly, various embodiments of the disclosure relate to managing drone-coupled UEs. As used herein, a drone-coupled UE refers to any UE that is attached to, or configured to be attached to, a drone, irrespective of whether the drone-coupled UE is actually in-flight. Drone-coupled UEs may include "authorized" drone-coupled UEs (e.g., UEs that are authorized to be registered with a terrestrial wireless communication subscriber network as a drone-coupled UE, for in-flight communicative support, or both) and "unauthorized" drone-coupled UEs (e.g., UEs that unauthorized to be registered with a terrestrial wireless communication subscriber network as a drone-coupled UE, for in-flight communicative support, or both). Moreover, as described above with respect to FIG. 2B, the manner in which drone-coupled UEs are coupled to respective drones via a physical coupling (e.g., a temporary physical coupling such as being taped onto the drone, or a semi-permanent coupling such as being integrated or built-into a structure of the drone), a communicative coupling (e.g., the drone-coupled UE is interfaced communicatively to a controller on the drone, to permit the drone-coupled UE to engage in flight control of the drone), or both.

Figure 8:
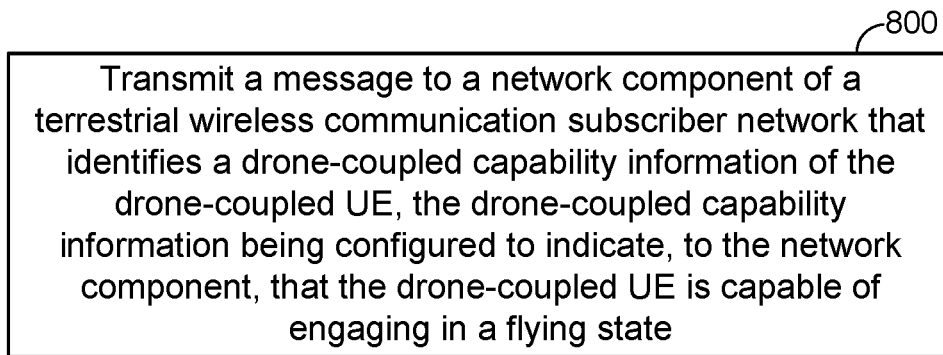
FIGS. 8-9 illustrate procedures by which a drone-coupled status of a drone-coupled UE can be conveyed to a network component of a terrestrial wireless communication subscriber network in accordance with embodiments of the disclosure.
Figure 9:
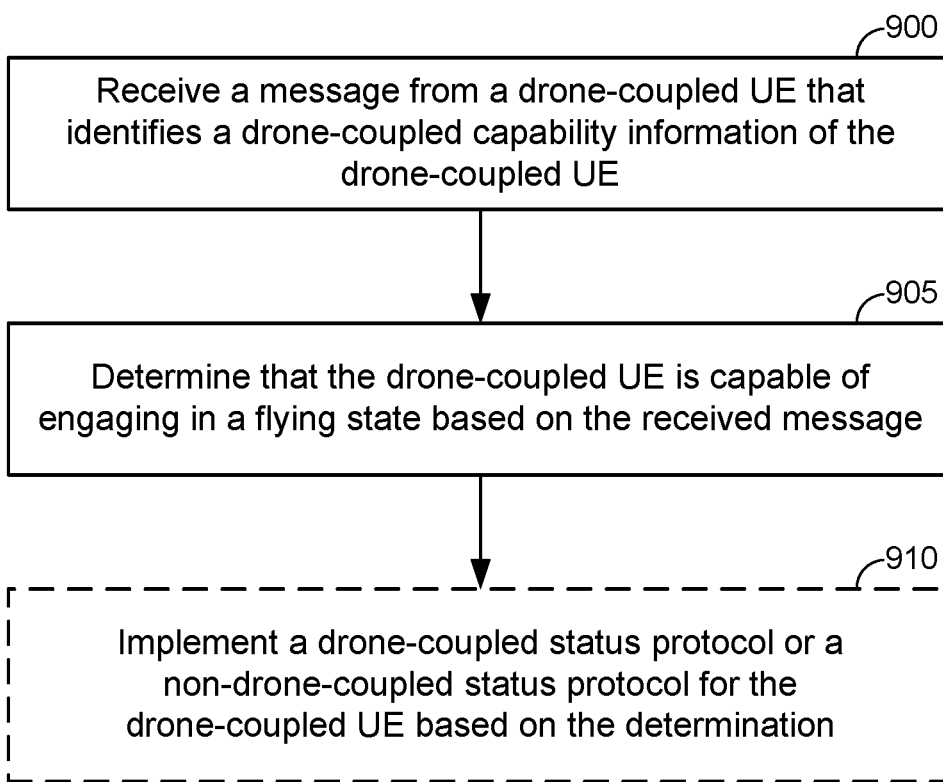

FIGS. 8-9 illustrate procedures by which a drone-coupled capability information of a drone-coupled UE (e.g., UE 200 of FIGS. 2A-2B) can be conveyed to a network component (e.g., network component 300 of FIG. 3) of a terrestrial wireless communication subscriber network in accordance with embodiments of the disclosure. In particular, FIG. 8 illustrates operation of the drone-coupled UE, and FIG. 9 illustrates operation of the network component of the terrestrial wireless communication subscriber network.

Referring to FIG. 8, at block 800, the drone-coupled UE transmits a message to a network component of a terrestrial wireless communication subscriber network that identifies a drone-coupled capability information of the drone-coupled UE. More specifically, identification of the UE as having a drone-coupled capability information is configured to indicate, to the network component, that the drone-coupled UE is capable of engaging in a flying state. Similarly, with reference to FIG. 9, at block 900, the network component receives a message from a drone-coupled UE that identifies a drone-coupled capability information of the drone-coupled, and at block 905, the network component determines that the drone-coupled UE is capable of engaging in a flying state based on the received message.

Referring to FIGS. 8-9, in an example, the message conveyance at blocks 800 and 900 may be implemented during an initial Attach procedure between the drone-coupled UE and a base station of the terrestrial wireless communication subscriber network. For example, the message of block 800 may a UE capability signaling message (e.g., new messages such as drone UE=True or droneFunctions=supported may be defined and signaled). In another example, one or more new UE categories may be defined and/or one or more defined UE categories may be reserved for drone-coupled UEs, and the message of blocks 800 and 900 may identify the drone-coupled UE as belonging to this reserved UE category. In another example, regulators and/or network operators of terrestrial wireless communication subscriber networks (e.g., mobile network operators or MNOs) may assign different subscriber IDs and/or certification IDs to drone-coupled UEs that are authorized for network access. For example, a block of subscriber IDs and/or certification IDs may be reserved for drone-coupled UEs that are authorized for network access, such that the drone-coupled capability information of a drone-coupled UE can be conveyed to the network component via the drone-coupled UE's assigned subscriber ID and/or certification ID belonging to this reserved block.

Referring to FIGS. 8-9, in another example, different regulators and/or MNOs may have different certification criteria and/or procedures for authorizing network access to drone-coupled UEs. For example, drone-coupled UEs that are authorized for network access may be issued predefined keys or identification codes to be used as "certificates". In an example, the certificates may be encrypted. The certificates may be provided to the network component by the UE using Non-Access Stratum (NAS) signaling (e.g., during initial attach procedure, or as a dedicated RRC connection reconfiguration procedure later). The network component (e.g., a core network component) can perform authentication of the certificate/code and, if authenticated, deliver such information (e.g. drone authentication success message) to the RAN over S1 signaling or other signaling method.

At block 910, the network component optionally implements a drone-coupled status protocol or a non-drone-coupled status protocol for the drone-coupled UE based on the determination from block 905. More specifically, a determination may be made as to whether drone-coupled service is authorized generally and/or whether drone-coupled service is authorized for this particular drone-coupled UE, and service may be provided (or not provided) accordingly. In an example, if the terrestrial wireless communication subscriber network is not capable of providing drone-related service to any drone-coupled UE (e.g., due to lack of drone-coupled service authorization), a service-rejection drone-coupled status protocol may be implemented by default. Generally, the non-drone-coupled status protocol refers to normal operation (e.g., providing the same level of service to the drone-coupled UE as is provided by the terrestrial wireless communication subscriber network to one or more non-drone-coupled UEs), whereas the drone-coupled status protocol refers to implementation of any of a variety of actions specifically for drone-coupled UEs that may be expected to fly from time to time. These actions include, but are not limited to, any combination of the following:

- Refuse to admit the drone-coupled UE to the terrestrial wireless communication subscriber network if the drone-coupled UE is unauthorized for drone-coupled service;
- Admit the drone-coupled UE to the terrestrial wireless communication subscriber network for service only while the drone-coupled UE is not engaged in a flying state based on the drone-coupled UE being authorized for drone-coupled service and unauthorized for in-flight service;
- Admit the drone-coupled UE to the terrestrial wireless communication subscriber network for a subset of drone-coupled services while the drone-coupled UE is not engaged in a flying state, the subset of drone-coupled services including at least one service that is not available to non-drone-coupled UEs (i.e., drone-coupled UEs are allocated partial service even when grounded);
- Implement a power control scheme for the drone-coupled UE that is different from power control schemes used for UEs that do not have drone-coupled capability information; and/or
- Implement a different charging or pricing scheme for the drone-coupled UE that is different than charging and/or pricing schemes used for UEs that do not have drone-coupled capability information.

Figure 10A:
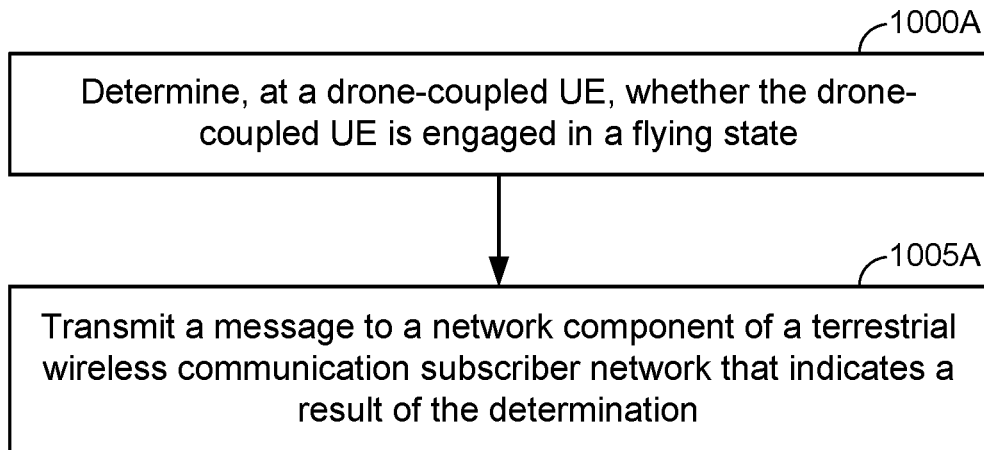
FIG. 10A illustrates a process by which a drone-coupled UE conveys a message indicative of in-flight status in accordance with an embodiment of the disclosure.

FIG. 10A illustrates a process by which a drone-coupled UE conveys a message indicative of in-flight status in accordance with an embodiment of the disclosure. Referring to FIG. 10A, at block 1000A, the drone-coupled UE determines whether it is currently engaged in a flying state. The determination of block 1000A can occur in a variety of ways. For example, the drone-coupled UE may be communicatively coupled to a drone, which notifies the drone-coupled UE as to whether the drone is currently engaged in the flying state (or flying mode), e.g., based on the status of one or more of its mechanical or electrical components. In another example, various measurements (e.g., speed, altitude, etc.) made independently by the drone-coupled UE itself may be sufficient for the drone-coupled UE to determine and/or differentiate between its in-flight or grounded status. In one example, such determination may be based on a reference altitude/height threshold, i.e., if the current altitude/height of the drone-coupled UE meets the threshold requirement, then the UE is considered to be in a flying state. In one example, the determination may be based on the speed of the drone-coupled UE. In another example, the determination may be based on the direction in addition to the speed (i.e., velocity). In another example, the determination may be based on the combination of the above. In one example, such threshold(s) (e.g., reference height, threshold height, speed, velocity etc.) may be provided by the network to the UE.

Referring to FIG. 10A, at block 1005A, the drone-coupled UE transmits a message to a network component of a terrestrial wireless communication subscriber network that indicates a result of the determination of block 1000A. In an example, the message of block 1005A may expressly indicate whether the drone-coupled UE is currently engaged in the flying state (e.g., via dedicated RRC signaling). For example, the message of block 1005A may be a measurement reporting message configured with a new parameter such as nowFlying=True or nowFlying=False. In another example, the drone-coupled UE may have different identifiers for use during terrestrial mode and flight mode (e.g., different International Mobile Subscriber Identities (IMSIs), new Globally Unique Temporary Identifier (GUTI) when the drone-coupled UE is in the flying state, different certificate ID/code, etc.). The drone-coupled UE may use these different IDs to communicate whether the drone-coupled UE is operating in the flying state or a non-flying state.

Referring to FIG. 10A, in another example, the message of block 1005A may facilitate some action to be taken and/or request that some action be taken based on the determination of block 1000A without necessarily providing an express indication to the network component as to whether the drone-coupled UE is currently engaged in the flying state. For example, as described below with respect to FIG. 12A, the drone-coupled UE may request a handover protocol transition in response to a detected transition of the drone-coupled UE between the flying state and the non-flying state. In another example, as described below with respect to FIG. 12A, the drone-coupled UE may request a power control protocol transition in response to a detected transition of the drone-coupled UE between the flying state and the non-flying state. Such requests may qualify as indirect indications to the network component with regard to the flight status of the drone-coupled UE (e.g., a request to transition the drone-coupled UE to a flying state handover protocol may imply a transition of the drone-coupled UE to the flying state, whereas a request to transition the drone-coupled UE to a non-flying state handover protocol may imply a transition of the drone-coupled UE to the non-flying state, and a request to transition the drone-coupled UE to a flying state power control protocol may imply a transition of the drone-coupled UE to the flying state, whereas a request to transition the drone-coupled UE to a non-flying state power control protocol may imply a transition of the drone-coupled UE to the non-flying state). In another example, the message of block 1005A may facilitate the network component to perform action(s) to be taken without expressly requesting that the action(s) be taken.

Referring to FIG. 10A, in another example, the message of block 1005A may be transmitted to the network component in an event-triggered manner each time a flight status of the drone-coupled UE changes (e.g., each time the drone-coupled UE transitions between the flying state and the non-flying state). For example, the drone-coupled UE may continuously monitor various parameters (e.g., altitude/height, speed, direction of movement, etc.) and may transmit the message of block 1005A once one or more of the measured parameters cross(es) respective threshold(s) (e.g., which may be provided to the drone-coupled UE by the network). In another example, the message of block 1005A may be transmitted to the network component in each instance of a periodic message (e.g., the measurement reporting message noted above) irrespective of whether the flight status of the drone-coupled UE has changed. Further, the process of FIG. 10A may execute after the process of FIG. 8 in at least one example.

Figure 10B:
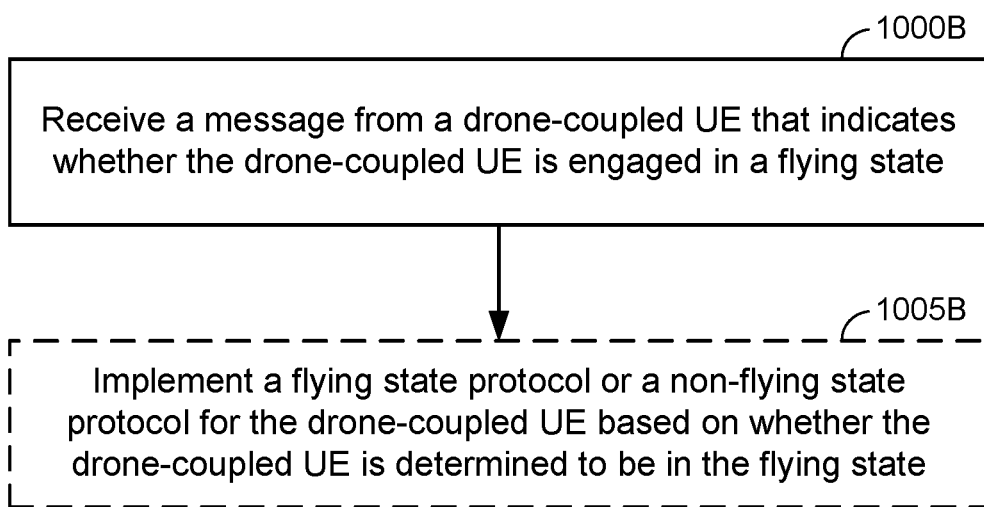
FIG. 10B illustrates a process by which a network component receives a message indicative of in-flight status for a drone-coupled UE in accordance with an embodiment of the disclosure.

FIG. 10B illustrates a process by which a network component receives a message indicative of in-flight status for a drone-coupled UE in accordance with an embodiment of the disclosure. The process of FIG. 10B is implemented at a network component (e.g., network component 300 of FIG. 3) of a terrestrial wireless communication subscriber network, such as a RAN component or core network component.

Referring to FIG. 10B, at block 1000B, the network component receives a message from a drone-coupled UE indicating whether the drone-coupled UE is engaged in a flying state. For example, the message received at block 1000B may correspond to the message transmitted by the drone-coupled UE at block 1005A of FIG. 10A.

At block 1005B, the network component optionally implements a flying state protocol or a non-flying state protocol for the drone-coupled UE based on the message received at block 1000B. Generally, the non-flying state protocol refers to normal operation (e.g., providing the same level of service to the drone-coupled UE as is provided by the terrestrial wireless communication subscriber network to one or more non-drone-coupled UEs), whereas the flying state protocol refers to implementation of any of a variety of actions specifically for flying UEs. These actions include, but are not limited to, any of the actions described below with respect to 1105A of FIG. 11A.

Figure 11A:
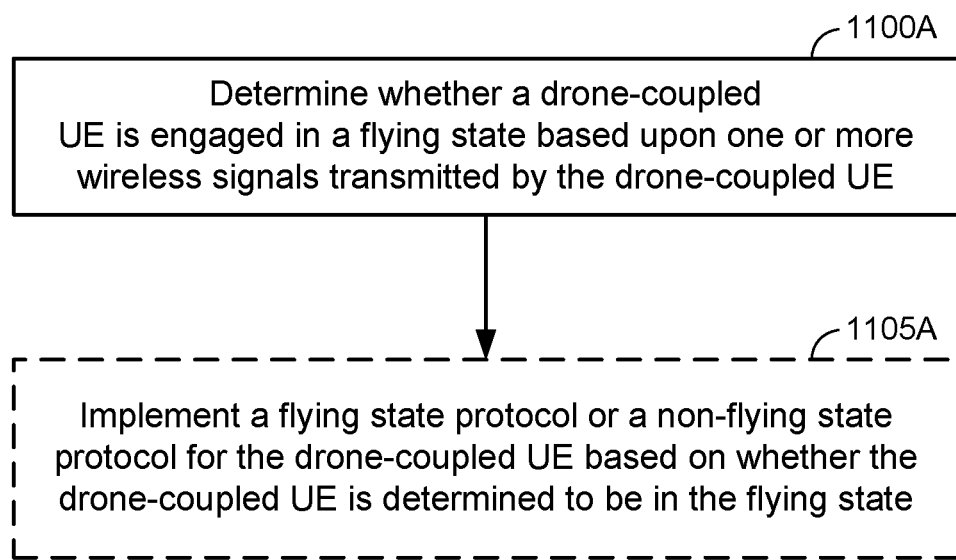
FIG. 11A illustrates a process of selectively implementing a flying state protocol or a non-flying state protocol for a drone-coupled UE in accordance with an embodiment of the disclosure.

FIG. 11A illustrates a process of selectively implementing a flying state protocol or a non-flying state protocol for a drone-coupled UE in accordance with an embodiment of the disclosure. The process of FIG. 11A is implemented at a network component (e.g., network component 300 of FIG. 3) of a terrestrial wireless communication subscriber network, such as a RAN component or core network component.

Referring to FIG. 11A, at block 1100A, the network component determines whether a drone-coupled UE is engaged in a flying state based upon one or more wireless signals transmitted by the drone-coupled UE. The determination of block 1100A may occur in a variety of ways. In a first example, the determination of block 1100A may be based on a message from the drone-coupled UE (e.g., the message may correspond to the one or more wireless signals if the network component is an access network component, or alternatively the message may be carried on the one or more wireless signals and then transported to the network component via a backhaul if the network component is a core network component), such as an express flying-state notification message received from the drone-coupled UE (e.g., via dedicated RRC signaling), a request to execute action(s) that indirectly indicate flying state status or non-flying state status, inclusion of an identifier that is specific to either the flying state or the non-flying state, and so on, as described with respect to block 1005A of FIG. 10A or block 1000B of FIG. 10B.

In a second example, the determination of block 1100A may be based on other types of messages from the drone-coupled UE, such as measurement reporting of current position data from the drone-coupled UE including elevation/altitude. For example, the network component may compare a current height of the drone-coupled UE with a height threshold to determine whether or not the drone-coupled UE is engaged in the flying state (e.g., if the drone-coupled UE's current height is above the height threshold, then the flying state is determined for the drone-coupled UE). A speed of the drone-coupled UE may also be factored into the determination. For example, the network component may compare a current speed of the drone-coupled UE with a speed threshold to determine whether or not the drone-coupled UE is engaged in the flying state (e.g., if the drone-coupled UE's current speed is above the threshold speed, then the flying state is determined for the drone-coupled UE). In another example, the determination may be based on direction of movement of the drone-coupled UE in addition to the speed (i.e., velocity). In yet another example, the determination may be based on the combination of the above.

Referring to block 1100A of FIG. 11A, in a third example, the determination of block 1100A may be based on internal coordination of different cells (or base stations) of the terrestrial wireless communication subscriber network. For example, the network component may compare received power of one or more uplink signals from the drone-coupled UE as measured at different base stations (e.g., both near the drone-coupled UE and far away from the drone-coupled UE). Due to increased free-space propagation for drone-coupled UEs in the flying state, base stations farther away from the drone-coupled UE (e.g., beyond a distance threshold) measuring the drone-coupled UE's uplink signals as being strong (e.g., above an uplink signal strength threshold) may be an indicator that the drone-coupled UE is engaged in the flying state.

Figure 11B:
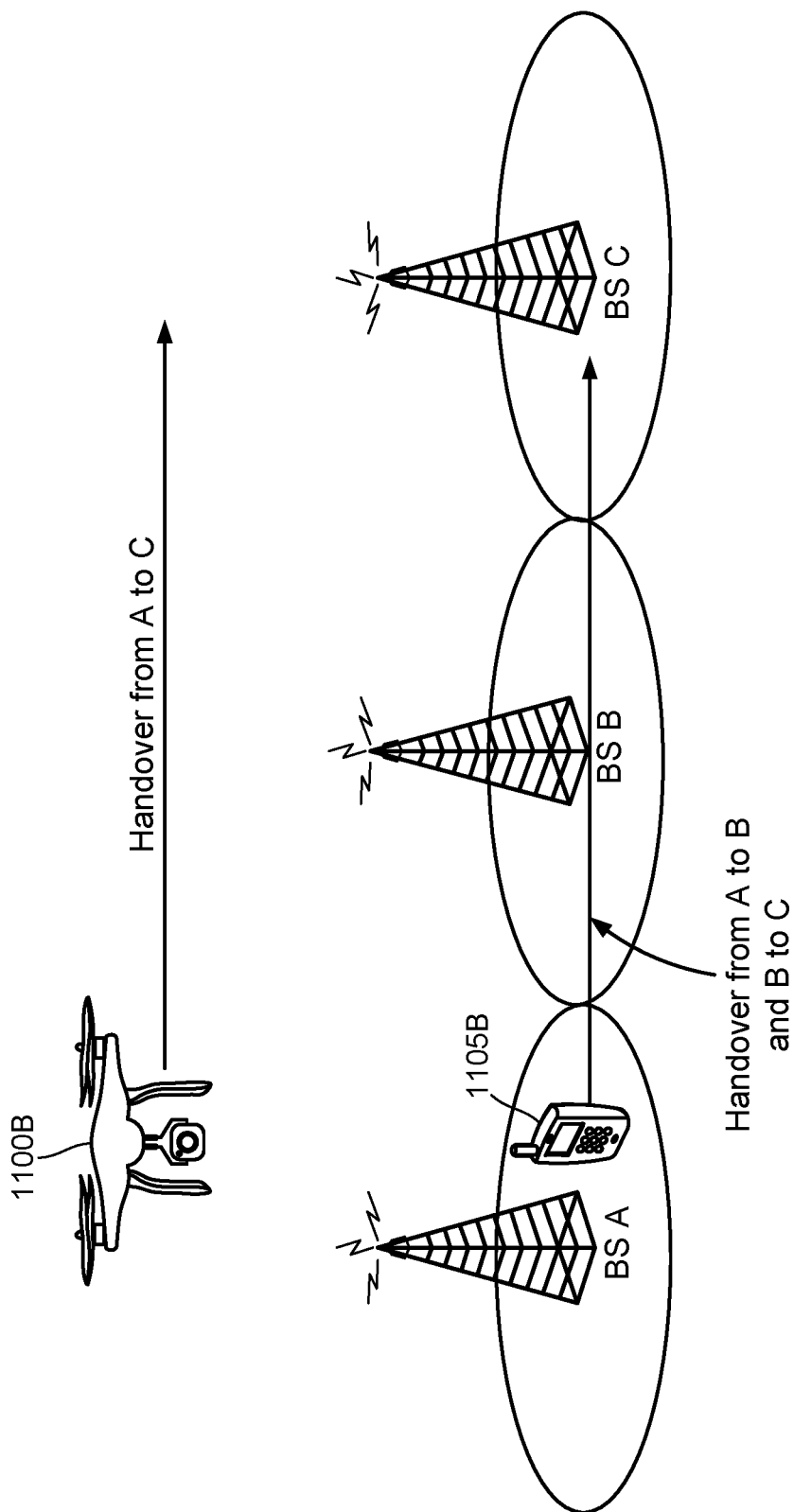
FIG. 11B illustrates a drone-coupled UE handing off directly between base stations while skipping or bypassing an intervening base station in accordance with an embodiment of the disclosure.

In another example, a mobility pattern of the drone-coupled UE may be evaluated. Drone-coupled UEs engaged in the flying state are expected to have less frequent handovers (e.g., because environmental changes and propagation loss over time are more predictable), such that direct neighbor cells may be "skipped" during handoff, which does not normally occur with respect to UEs that are not flying. This scenario is shown in FIG. 11B, whereby a UE coupled to drone 1100B hands off directly from BS A to BS C (skipping or bypassing "intervening" BS B), while UE 1105B (which is not flying) hands off from BS A to BS B, and then later from BS B to BS C. It will be appreciated that UE handoffs are determined in part based upon wireless signal(s) from the UE, such that this example of block 1100A is also based in part upon wireless signal(s) from the drone-coupled UE.

Referring to block 1100A of FIG. 11A, in a fourth example, the determination of block 1100A may be based on an estimated angle of arrival of an uplink signal from the drone-coupled UE. For example, with multi-antenna technologies, a base station may estimate the angle of arrival of the received uplink signal from the drone-coupled UE (e.g., based on one or more angle-of-arrival measurements). The base station (or another network component to which the base station reports the angle of arrival) may then estimate whether a transmitter at the drone-coupled UE is on the ground or above the ground (i.e., in a flying state) by comparing the angle of arrival to a threshold.

At block 1105A, the network component optionally implements a flying state protocol or a non-flying state protocol for the drone-coupled UE based on the determination from block 1100A. Generally, the non-flying state protocol refers to normal operation (e.g., providing the same level of service to the drone-coupled UE as is provided by the terrestrial wireless communication subscriber network to one or more non-drone-coupled UEs), whereas the flying state protocol refers to implementation of any of a variety of actions specifically for flying UEs. These actions include, but are not limited to, any combination of the following:

Refuse to admit the drone-coupled UE to the terrestrial wireless communication subscriber network if the drone-coupled UE is unauthorized for drone-coupled service and/or flying state service, and/or if the terrestrial wireless communication subscriber network is unable to provide drone-coupled service and/or flying state service. In an example, whether or not the drone-coupled UE is authorized or unauthorized for drone-coupled service and/or for flying state service can be determined by querying a Home Subscriber Server (HSS) at the core network of the terrestrial wireless communication subscriber network. For example, the subscription information for the drone-coupled UE may be stored as part of the Universal Integrated Circuit Card (UICC) or UE configuration. In a further example, new cause values for connection rejection may be established for notifying an unauthorized drone-coupled UE with respect to the admission refusal (e.g., not-A-Drone, droneServiceUnavailable, etc.). Alternatively or additionally, in another example, new messages may be defined to signal whether a particular drone-coupled UEs is authorized for service. Hence, the absence of such a message may indicate that the particular service is unauthorized for that particular drone-coupled UE. Such signaling may be based on dedicated RRC signaling, as discussed below with respect to FIG. 13;

Authorize restricted or limited service (e.g., lower transmission power, lower bandwidth or QoS, etc.) to the drone-coupled UE to the terrestrial wireless communication subscriber network if the drone-coupled UE is unauthorized for drone-coupled service and/or flying state service but it is in a flying state. Once the drone-coupled UE is determined to no longer be engaged in the flying state, the unauthorized drone-coupled UE may then be disconnected from the terrestrial wireless communication subscriber network. Moreover, the unauthorized drone-coupled UE may optionally be blacklisted thereafter from the terrestrial wireless communication subscriber network altogether for breaching the terms of use for the unauthorized drone-coupled UE;

Authorize service to the drone-coupled UE while assessing a surcharge to an account of the drone-coupled UE if is not subscribed for drone-coupled service and/or flying state service;

Implement a power control scheme for the drone-coupled UE in the flying state that is different from power control schemes used for drone-coupled UEs that are not in the flying state;

Implement a different charging or pricing scheme for the drone-coupled UE in the flying state that is different than charging and/or pricing schemes used for drone-coupled UEs that are not in the flying state; and/or Implement a different handover scheme for the drone-coupled UE in the flying state that is different than a handover protocol used for drone-coupled UEs in a non-flying state (e.g., discussed in more detail below with respect to FIGS. 12A-12B).

As discussed above with respect to FIGS. 11A-11B, handover characteristics associated with an in-flight drone-coupled UE may be different than a grounded or terrestrial UE. For example, the rate at which an in-flight drone-coupled UE hands off between base stations may generally be less than a typical grounded or terrestrial UE, and in-flight drone-coupled UEs may be more likely to "skip" or bypass intervening base stations, as shown in FIG. 11B. Also, a radio link failure (RLF) rate may be lower for in-flight drone-coupled UEs relative to grounded or terrestrial UEs due to the in-flight drone-coupled UEs being more likely to have a direct LOS to their serving base station and/or more deterministic path loss. In other words, there are fewer environmental obstructions at higher altitudes, such that a sudden RLF is less likely for in-flight drone-coupled UEs.

Figure 12A:
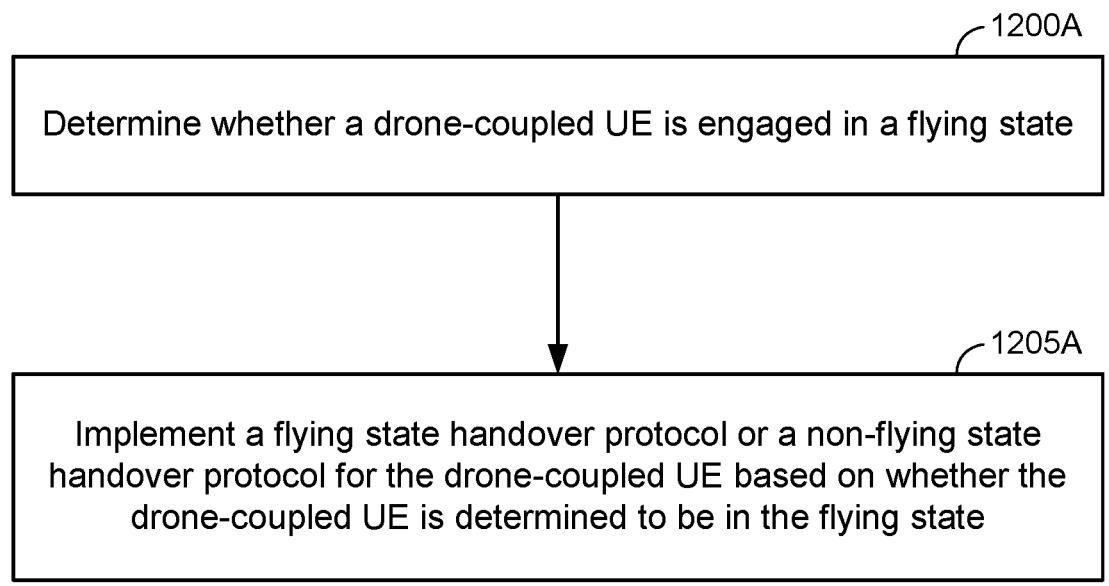
FIG. 12A illustrates an example implementation of the process of FIG. 11A in accordance with an embodiment of the disclosure.

FIG. 12A illustrates an example implementation of the process of FIG. 11A in accordance with an embodiment of the disclosure. Referring to FIG. 12A, at block 1200A, the network component determines whether a drone-coupled UE is engaged in a flying state. Block 1200A may be implemented using any of the methodologies described above with respect to block 1100A of FIG. 11A. At block 1205A, the network component optionally implements a flying state handover protocol or a non-flying state handover protocol for the drone-coupled UE based on the determination from block 1200A. As will be appreciated, block 1205A represents an example of block 1100A of FIG. 11A specific to handover.

Referring to FIG. 12A, in an example, the flying state handover protocol may be configured with new hysteresis and threshold parameters related to handover that are customized (or optimized) for expected conditions associated with in-flight drone-coupled UEs. Moreover, the process of FIG. 12A may be repeated each time the network component makes a new determination as to whether the drone-coupled UE is engaged in the flying state or the non-flying state.

In an example, to avoid a "ping-ponging" effect while the drone-coupled UE is actively connected to the terrestrial wireless communication subscriber network (e.g., RRC Connected mode), a different set of thresholds for characterizing a drone-coupled UE as being in the flying state or the non-flying state may be used for the purpose of making a handover protocol switching decision than for other flying/non-flying state determinations. In other words, the determination of block 1200A may be configured to provide a higher degree of confidence that the drone-coupled UE has truly switched between the flying state and the non-flying state before the handover protocol is authorized to be switched. For example, assume that a "default" minimum height threshold to qualify for the flying state is normally 30 m. Now further assume that a drone-coupled UE is determined to be in a non-flying state, such that the network component is implementing a non-flying state handover protocol for the drone-coupled UE. In this case, the minimum height threshold for implementing a handover protocol transition may be augmented (e.g., to 40 m, 50 m, etc.) to avoid ping-ponging. So, different thresholds and/or parameters may be utilized for assessing grounded or in-flight status of a drone-coupled UE in certain circumstances. This way, a brief "dip" (or altitude drop) of the drone-coupled while in-flight will not trigger a handover protocol change, and likewise a false start (or quick altitude increase followed by a return to ground) will not trigger a handover protocol change. In a further example, the various thresholds and/or parameters used to assess grounded or in-flight status of a drone-coupled UE may be configurable (e.g., using dedicated RRC signaling or a broadcast SIB), either for all drone-coupled UEs or for particular groups or classes of drone-coupled UEs.

In a further example, while the drone-coupled UE is actively connected to the terrestrial wireless communication subscriber network (e.g., RRC Connected mode), a drone-coupled UE may provide assistance information to the network component that is configured to implicitly or expressly request a handover protocol transition (e.g., as described above with respect to block 1005A of FIG. 10A or block 1000B of FIG. 10B). In an example, the assistance information may be based on a current channel and/or interference environment of the drone-coupled UE as perceived via its own measurements. For example, the drone-coupled UE may transmit the assistance information to request a handover protocol transition in response to a determination that the drone-coupled UE has transitioned between the flying state and the non-flying state (e.g., the drone-coupled UE may start seeing a lot more strong neighbor base stations and determine that the drone-coupled UE is likely in-flight, such that the flying state handover protocol is now preferred, which triggers the request to be sent). Accordingly, the status of the drone-coupled UE as being flying or grounded at block 1200A may be inferred from a message from the drone-coupled UE that requests a particular handover protocol, which may occur as described above with respect to block 1005A of FIG. 10A or block 1000B of FIG. 10B in one example.

Referring to FIG. 12A, it is possible that a drone-coupled UE can be engaged in the flying state while still being in an Idle mode (e.g., RRC Idle) with respect to the terrestrial wireless communication subscriber network. For example, the drone-coupled UE may be controlled via a different network type altogether (e.g., a satellite network, a direct LOS control system, a different terrestrial wireless communication subscriber network, etc.). In these instances, the network component will consider the drone-coupled UE to be Idle even while the drone-coupled UE is engaged in the flying state. These "idle and flying" drone-coupled UEs may be controlled by some mechanism other than the terrestrial wireless communication subscriber network, but may still want to connect to the terrestrial wireless communication subscriber network from time to time (e.g., to start transmitting audio and/or video data).

For these reasons, in at least one embodiment, different flying state handover protocols may be established based on whether an in-flight drone-coupled UE is in "Connected" mode or "Idle" mode with respect to the terrestrial wireless communication subscriber network.

In Idle mode, a Tracking Area Identifier (TAI) list may be used to determine a general area where the Idle drone-coupled UE is located. The size of the TAI list determines the size of a paging radius for the Idle drone-coupled UE in the event that the Idle drone-coupled UE needs to be paged by the terrestrial wireless communication subscriber network. As noted above, unlike UEs on the ground, in-flight drone-coupled UEs may be more likely of reselecting cells from different TAI lists due to the different mobility patterns of the in-flight drone-coupled UEs. In other words, more neighbor cells will generally be in serving range of in-flight drone-coupled UEs, such that in-flight drone-coupled UEs have more options in terms of neighbor cell reselection. Accordingly, the flying state handover protocol may include a larger paging radius and/or a cell reselection list encompassing cells in a larger area relative to the non-flying state handover protocol.

Consider for instance a TAI list 1 (or "TAI1") that contains cells {1, 2, 3, 4}, whereas a TAI list 2 (or "TAI2") that contains cells {5, 6, 7, 8}. A terrestrial or grounded Idle UE may perform a Tracking Area Update (TAU) only when the Idle UE goes from cell 4 to 5, for example, whereas an Idle in-flight drone-coupled UE while camped on cell 2 may also see cell 6 or 7 as suitable cell. This may trigger more frequent TAUs for the Idle in-flight drone-coupled UE if only TAI1 or TAI2 are allocated to the Idle in-flight drone-coupled UE. On the other hand, if the network component (e.g., an MME) allocates TAI1+TAI2 (union set of the two, for example, which is {1, 2, 3, 4, 5, 6, 7, 8} in above example) as a TAI list to the Idle in-flight drone-coupled UE, the frequency of reporting (e.g., TAUs) may be reduced from the Idle in-flight drone-coupled UE. Accordingly, the flying state handover protocol may include one or more different location reporting parameters (e.g., reduced location reporting) while in Idle mode relative than the non-flying state handover protocol.

In an LTE-specific example, an eNB may need to report whether the Idle drone-coupled UE is airborne (or engaged in the flying state, i.e., in-flight) to the MME on a periodic basis so that the MME can update the corresponding TAI list for the Idle drone-coupled UE. In an example, the eNB may report measurement information related to the Idle drone-coupled UE to the MME (e.g., current height/altitude), or alternatively may expressly indicate to the MME whether the Idle drone-coupled UE is engaged in the flying state or the non-flying state. In an example where the eNB reports the height of the Idle drone-coupled UE to the MME, the MME may determine whether the Idle drone-coupled UE is flying or not by comparing a reported height of the Idle drone-coupled UE to a height threshold. In a further example, one or more new threshold parameters may be introduced for Idle mode reselection for in-flight drone-coupled UEs. For example, a different value for $S_{IntraSearchP}$ can be implemented for in-flight drone-coupled UEs as part of the flying state handover protocol relative to non-flying UEs. While this particular example is LTE-specific, it will be appreciated that other embodiments can be directed to any wireless communications scheme (e.g., 5G NR, etc.).

Figure 12B:
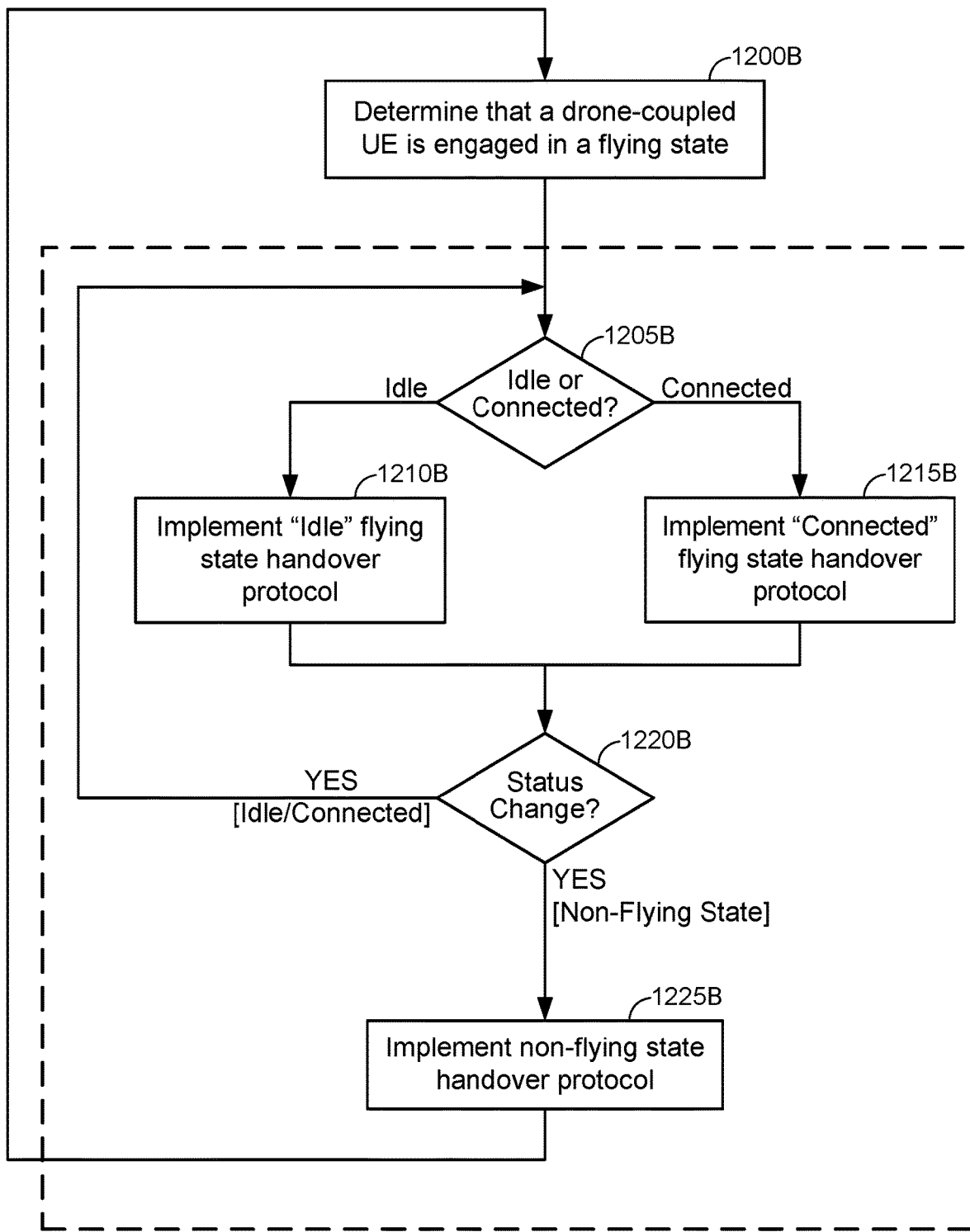
FIG. 12B illustrates a more detailed implementation of the process of FIG. 12A in accordance with an embodiment of the disclosure.

FIG. 12B illustrates a more detailed implementation of the process of FIG. 12A in accordance with an embodiment of the disclosure. Referring to FIG. 12B, at block 1200B, a network component of a terrestrial wireless communication subscriber network determines a drone-coupled to be engaged in a flying state. At block 1205B, the network component determines whether the drone-coupled UE is in an "Idle" or "Connected" mode with respect to the terrestrial wireless communication subscriber network. If the network component determines that the drone-coupled UE is in an "Idle" mode with respect to the terrestrial wireless communication subscriber network at block 1205B, the network component implements an "Idle" flying state handover protocol for the drone-coupled UE at block 1210B. Otherwise, if the network component determines that the drone-coupled UE is in a "Connected" mode with respect to the terrestrial wireless communication subscriber network at block 1205B, the network component implements a "Connected" flying state handover protocol for the drone-coupled UE at block 1215B.

Referring to FIG. 12B, at block 1220B, the network component determines whether any status change has occurred that is sufficient to trigger a handover protocol transition for the drone-coupled UE. Examples of status changes that are sufficient to trigger a handover protocol transition for the drone-coupled UE may include a transition of the drone-coupled UE from Connected mode to Idle mode (or vice versa), or from the flying state to the non-flying state. While not shown expressly in FIG. 12B, if the network component determines that no status change has occurred that is sufficient to trigger a handover protocol transition for the drone-coupled UE at block 1220B, the network component maintains the drone-coupled UE in its current handover protocol. If the network component determines that the drone-coupled UE has transitioned between Connected mode and Idle mode while still being engaged in the flying state at block 1220B, the process returns to block 1205B and a different flying state handover protocol is implemented for the drone-coupled UE. If the network component determines that the drone-coupled UE has transitioned to the non-flying state at block 1220B, the network component switches the drone-coupled UE to the non-flying state handover protocol at 1225B. The process then returns to block 1200B, where the network component monitors the drone-coupled UE to determine whether the drone-coupled UE re-engages the flying state.

Figure 13:
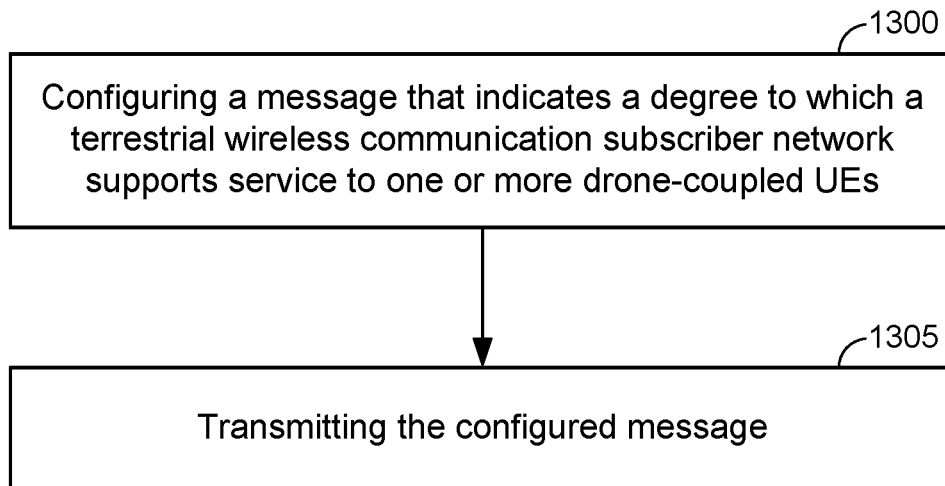
FIG. 13 illustrates a process by which a network component of a terrestrial wireless communication subscriber network conveys an available support status for drone-related service in accordance with an embodiment of the disclosure.

FIG. 13 illustrates a process by which a network component (e.g., a RAN component or core network component)

of a terrestrial wireless communication subscriber network conveys an available support status for drone-related service in accordance with an embodiment of the disclosure. At block 1300, the network component configures a message that indicates a degree to which the terrestrial wireless communication subscriber network supports service to one or more drone-coupled UEs. At block 1305, the network component transmits the configured message.

Referring to FIG. 13, the message configured at block 1300 and transmitted at block 1305 may be either a dedicated (e.g., unicast) message that is targeted to a particular target UE, or a broadcast message that is targeted more generally to UEs being served by the terrestrial wireless communication subscriber network.

Referring to FIG. 13, in an example where the message transmitted at block 1305 is a dedicated (or unicast) message, the message at block 1305 may be implemented via dedicated Radio Resource Control (RRC) signaling using a new Information Element (IE) and/or new field(s) in existing IE(s):

```
RRCConnectionSetupComplete-vXXYY-IEs ::= SEQUENCE {
    uav-Services-rXX      ENUMERATED {supported}  OPTIONAL,
    nonCriticalExtension  SEQUENCE { }            OPTIONAL
}
```

Referring to FIG. 13, in an example where the message transmitted at block 1305 is a broadcast message, the message at block 1305 may be broadcast via a System Information Block (SIB) message. In a further example, the support of UEs coupled to certain types of UAVs may be restricted/allowed by reusing an Access Class Barring (ACB) method wherein the information of allowed/barred access classes is broadcast via a SIB. In a further example, certain terrestrial wireless communication subscriber networks may support service to drone-coupled UEs while other terrestrial wireless communication subscriber networks do not. In this case, the message at block 1305 may simply indicate whether or not drone-coupled UEs are supported at all, e.g. as a "flag". In an example, some drone-coupled UEs may still access the terrestrial wireless communication subscriber networks in "barred" terrestrial wireless communication subscriber networks, but only using "normal" procedures that do not involve their "drone-coupled" statuses (e.g., so long as the drone-coupled UEs are positioned terrestrially, or grounded, and do not actually engage in the flying state).

However, the barring of drone-related service could also be more nuanced. For example, the ACB may depend on the traffic type or drone-classes. For example, a drone-coupled UE that uses the terrestrial wireless communication subscriber network for video streaming may be barred, but one that uses the terrestrial wireless communication subscriber network for telemetry may not. Alternatively or additionally, a drone-coupled UE may belong to different drone-classes depending on the services it needs, out of which some services may be barred while others are not. In such case, the drone-coupled UE may want to initiate limited-service drone operation. As examples, the barring criteria may be such as:

Bar all drone-coupled UEs,
Bar all drone-coupled UEs that are engaged in the flying state, or
Bar all drone-coupled UEs that are engaged in the flying state while capturing videos that do not relate to a public service function.

Figure 14:
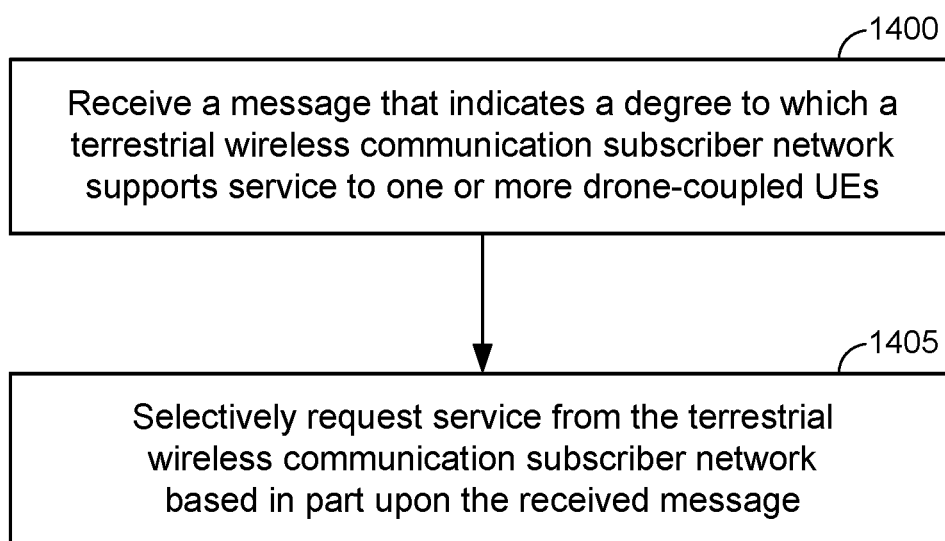
FIG. 14 illustrates a process by which a drone-coupled UE determines whether request service (and/or how much service to request) from a terrestrial wireless communication subscriber network in accordance with an embodiment of the disclosure.

FIG. 14 illustrates a process by which a drone-coupled UE determines whether to request service (and/or how much service to request) from a terrestrial wireless communication subscriber network in accordance with an embodiment of the disclosure. At block 1400, the drone-coupled UE receives a message that indicates a degree to which a terrestrial wireless communication subscriber network supports service to one or more drone-coupled UEs. For example, the message received at block 1400 may correspond to the message transmitted at block 1305 of FIG. 13 (e.g., via a unicast protocol such as dedicated RRC signaling, or a broadcast protocol such as a flag in a SIB or ACB via a SIB). At block 1405, the drone-coupled UE selectively requests service from the terrestrial wireless communication subscriber network based in part upon the received message. In particular, at block 1405, the drone-coupled UE may compare the degree to which the terrestrial wireless communication subscriber network supports service (e.g., either to the drone-coupled UE specifically or to a class of drone-coupled UE to which the drone-coupled UE belongs) to its own service requirement to determine how much (if any) service to request from the terrestrial wireless communication subscriber network.

Figure 15:
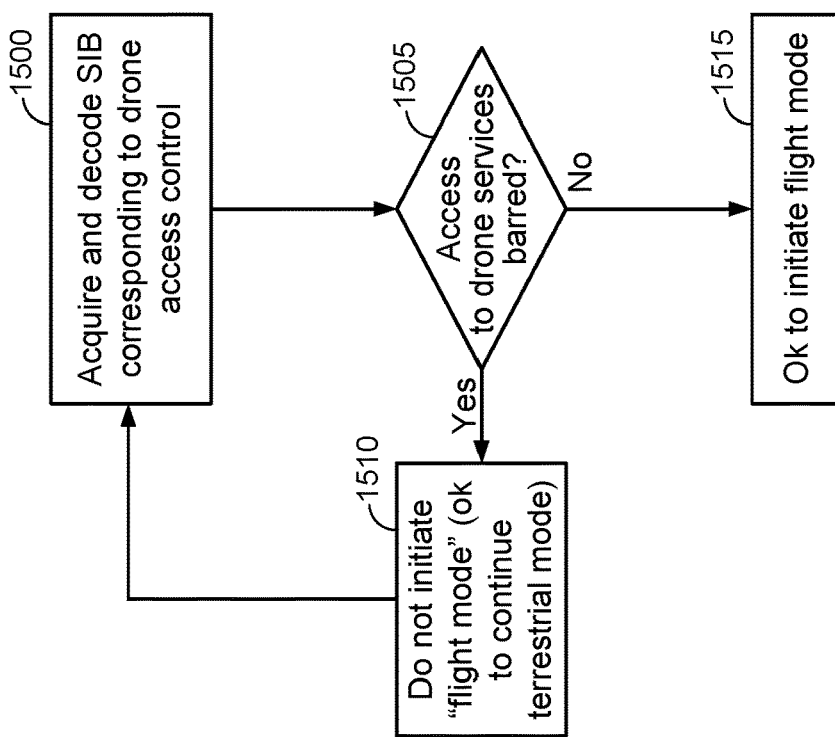
FIG. 15 illustrates an example implementation of the process of FIG. 14 in accordance with an embodiment of the disclosure.

FIG. 15 illustrates an example implementation of the process of FIG. 14 in accordance with an embodiment of the disclosure. In particular, FIG. 15 illustrates a broadcast-specific example of the drone-service availability message described above in FIG. 14, although it will be appreciated that other embodiments may be directed to dedicated (or unicast) implementations of the drone-service availability message.

Referring to FIG. 15, assume that a drone-coupled UE is connected to a terrestrial wireless communication subscriber network in a non-flying state (e.g., terrestrial mode) and wants to initiate flight mode that requires in-flight drone service from the terrestrial wireless communication subscriber network. At block 1500 (e.g., as in 1400 of FIG. 14), the drone-coupled UE acquires and decodes a SIB corresponding to drone access control. At block 1505, the drone-coupled UE determines if the SIB indicates whether the drone-coupled UE is barred from in-flight drone service from the terrestrial wireless communication subscriber network. If so, at block 1510, the drone-coupled UE does not initiate flight mode and instead continues in terrestrial mode. However, if the drone-coupled UE determines that the SIB indicates the drone-coupled UE is not barred from in-flight drone service from the terrestrial wireless communication subscriber network at block 1505, then the drone-coupled UE initiates a transition into flight mode at block 1515.

Figure 16:
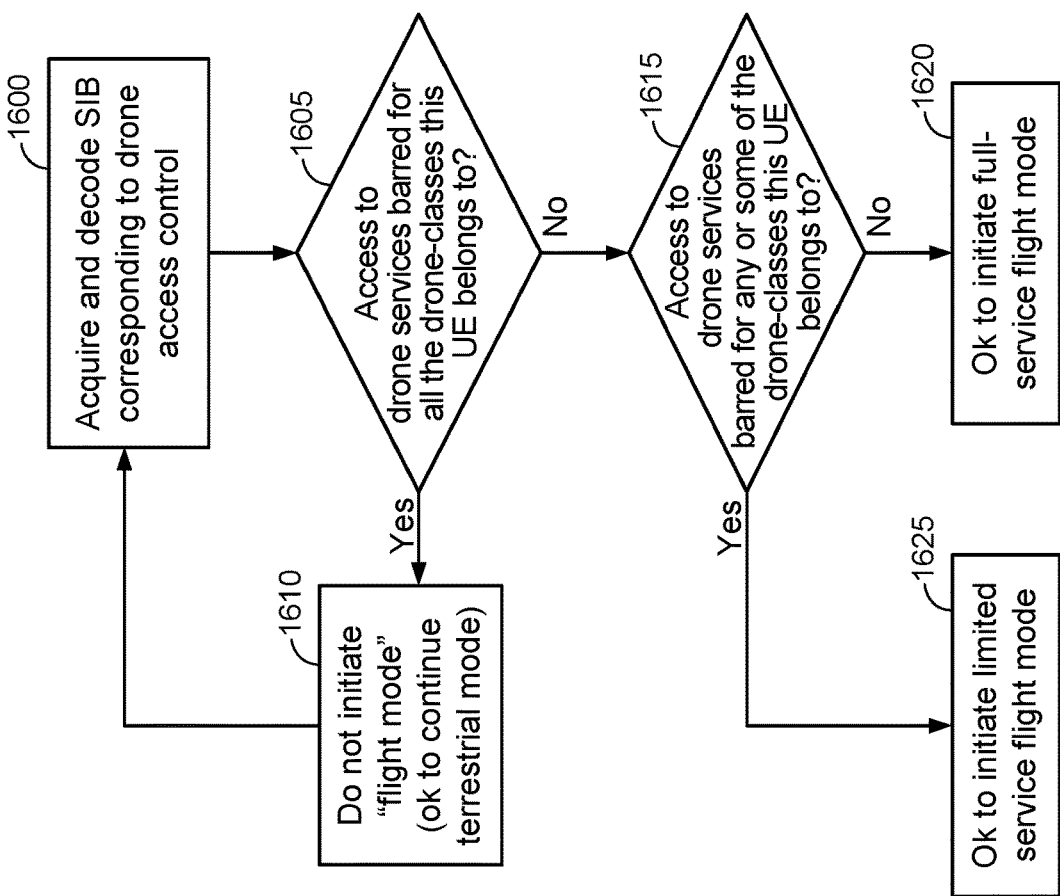
FIG. 16 illustrates an example implementation of the process of FIG. 14 in accordance with another embodiment of the disclosure.

FIG. 16 illustrates an example implementation of the process of FIG. 14 in accordance with another embodiment of the disclosure. FIG. 16 is similar to FIG. 15, but FIG. 16 relates to an implementation that involves more nuanced barring rules for drone-related service.

Referring to FIG. 16, assume that a drone-coupled UE is connected to a terrestrial wireless communication subscriber network in a non-flying state (e.g., terrestrial mode) and wants to initiate flight mode using one or more particular in-flight drone services from the terrestrial wireless communication subscriber network. At block 1600 (e.g., as in 1400 of FIG. 14), the drone-coupled UE acquires and decodes a SIB corresponding to drone access control. At block 1605, the drone-coupled UE determines if the SIB indicates whether the drone-coupled UE is barred from each of the one or more in-flight drone services from the terrestrial wireless communication subscriber network that are desired by the drone-coupled UE. If so, at block 1610, the drone-coupled UE does not initiate flight mode and instead continues in terrestrial mode. However, if the drone-coupled UE determines that the SIB indicates the drone-coupled UE is not barred from each of the one or more in-flight drone services from the terrestrial wireless communication subscriber network that are desired by the drone-coupled UE at block 1605, then the drone-coupled UE determines whether the SIB indicates the drone-coupled UE is barred from any of the one or more in-flight drone services from the terrestrial wireless communication subscriber network that are desired by the drone-coupled UE at block 1615.

Referring to FIG. 16, if the drone-coupled UE determines that each of its desired one or more in-flight drone services is available at block 1615, then "full-service" flight mode is initiated at block 1620. Alternatively, if the drone-coupled UE determines that less than all of its desired one or more in-flight drone services are available at block 1615, then "limited-service" flight mode is initiated at block 1625 using the available in-flight drone service(s).

As will be appreciated from a review of FIGS. 15-16, the drone-coupled UE may initiate a transition of the drone-coupled UE into a flying state if the indicated degree to which the terrestrial wireless communication subscriber supports service to drone-coupled UEs is above a threshold, and the drone-coupled UE may delay initiation of the transition of the drone-coupled UE into the flying state if the indicated degree to which the terrestrial wireless communication subscriber supports service to drone-coupled UEs is not above the threshold.

With respect to FIGS. 13-16, an embodiment is directed to a method of operating a network component of a terrestrial wireless communication subscriber network, comprising configuring a message that indicates a degree to which the terrestrial wireless communication subscriber supports service to one or more drone-coupled UEs, and transmitting the configured message. In an example, the transmitting transmits the configured message as a dedicated message that targets a single drone-coupled UE. In a further example, the dedicated message is implemented via dedicated RRC signaling using at least one IE. In a further example, the transmitting transmits the configured message as a broadcast message (e.g., via a SIB and/or via an ACB protocol) that targets multiple UEs. In a further example, the indicated degree to which the terrestrial wireless communication subscriber supports service to the one or more drone-coupled UEs is one of barring all drone-coupled UEs, barring all drone-coupled UEs engaged in a flying state, and/or barring all drone-coupled UEs engaged in the flying state while capturing videos that do not relate to a public service function. With respect to FIGS. 13-16, another embodiment is directed to a method of operating a drone-coupled UE, receiving a message that indicates a degree to which a terrestrial wireless communication subscriber network supports service to one or more drone-coupled UEs, selectively requesting service from the terrestrial wireless communication subscriber network based in part upon the received message. In an example, the received message is a dedicated message that individually targets the drone-coupled UE. In a further example, the dedicated message is implemented via dedicated RRC signaling using at least one IE. In a further example, the received message as a broadcast message (e.g., via a SIB and/or via an ACB protocol) that targets multiple UEs. In a further example, the indicated degree to which the terrestrial wireless communication subscriber supports service to the one or more drone-coupled UEs is one of barring all drone-coupled UEs, barring all drone-coupled UEs engaged in a flying state, and/or barring all drone-coupled UEs engaged in the flying state while capturing videos that do not relate to a public service function. In a further example, the drone-coupled UE initiates a transition of the drone-coupled UE into a flying state if the indicated degree to which the terrestrial wireless communication subscriber supports service to the one or more drone-coupled UEs is above a threshold, and delays initiation of the transition of the drone-coupled UE into the flying state if the indicated degree to which the terrestrial wireless communication subscriber supports service to the one or more drone-coupled UEs is not above the threshold.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a drone-coupled user equipment (UE), comprising:
   determining whether the drone-coupled UE is engaged in a flying state, the drone-coupled UE being associated with a first identifier and a second identifier, the first identifier being associated with the flying state and the second identifier being associated with a non-flying state; and
   transmitting a message to a network component of a terrestrial wireless communication subscriber network that indicates whether the drone-coupled UE is engaged in the flying state based on the determining, the message including the first identifier to indicate the flying state responsive to determining that the drone-coupled UE is engaged in the flying state, or including the second identifier to indicate the non-flying state responsive to determining that the drone-coupled UE is not engaged in the flying state.

2. The method of claim 1,
   wherein the determining is based upon an indication received at the drone-coupled UE from a drone to which the drone-coupled UE is coupled, or
   wherein the determining is based upon one or more measurements made by the drone-coupled UE.

3. The method of claim 2, wherein the one or more measurements include a speed measurement, an altitude measurement, a measurement indicating a direction at which the drone-coupled UE is traveling, or any combination thereof.

4. The method of claim 3, wherein the determining includes comparing the one or more measurements to one or more respective measurement thresholds.

5. The method of claim 4, further comprising:
   receiving, from the terrestrial wireless communication subscriber network, the one or more respective measurement thresholds which are used for the comparing.

6. The method of claim 1, wherein the message expressly indicates the result of the determining.

7. The method of claim 1, wherein the message is configured to facilitate the network component to execute one or more actions and/or request that the network component execute the one or more actions in a manner that indirectly indicates the result of the determining.

8. The method of claim 7,
   wherein the one or more actions include switching the drone-coupled UE between a flying state handover protocol and a non-flying state handover protocol, or
   wherein the one or more actions include switching the drone-coupled UE between a flying state power control protocol and a non-flying state power control protocol.

9. The method of claim 1, wherein the message is a measurement reporting message.

10. The method of claim 1,
    wherein the transmitting occurs in an event-triggered manner each time a flight status of the drone-coupled UE changes, or
    wherein the transmitting occurs periodically irrespective of whether the flight status of the drone-coupled UE has changed, or
    wherein the transmitting occurs upon receiving an indication from a network component of a terrestrial wireless communication subscriber network requesting transmission irrespective of whether the flight status of the drone-coupled UE has changed, or
    any combination thereof.

11. A method of operating a network component of a terrestrial wireless communication subscriber network, comprising:
    receiving a message from a drone-coupled user equipment (UE) that indicates whether the drone-coupled UE is engaged in a flying state, the drone-coupled UE being associated with a first identifier and a second identifier, the first identifier being associated with the flying state and the second identifier being associated with a non-flying state, the message including the first identifier to indicate the flying state responsive to the drone-coupled UE being engaged in the flying state, or including the second identifier to indicate the non-flying state responsive to the drone-coupled UE not being engaged in the flying state.

12. The method of claim 11, wherein the message is an express flying-state notification from the drone-coupled UE.

13. The method of claim 11, wherein the message from the drone-coupled UE facilitates the network component to execute one or more actions and/or requests the network component to execute the one or more actions in a manner that indirectly indicates whether the drone-coupled UE is engaged in the flying state.

14. The method of claim 13,
wherein the one or more actions include switching the drone-coupled UE between a flying state handover protocol and a non-flying state handover protocol, or
wherein the one or more actions include switching the drone-coupled UE between a flying state power control protocol and a non-flying state power control protocol.

15. The method of claim 11, wherein the message is a measurement reporting message.

16. The method of claim 11,
wherein the receiving occurs in an event-triggered manner each time a flight status of the drone-coupled UE changes, or
wherein the receiving occurs periodically irrespective of whether the flight status of the drone-coupled UE has changed, or
wherein the receiving occurs after indicating the UE by a network component of a terrestrial wireless communication subscriber network requesting transmission irrespective of whether the flight status of the drone-coupled UE has changed, or
any combination thereof.

17. The method of claim 11, further comprising:
implementing a flying state protocol or a non-flying state protocol for the drone-coupled UE based on whether the message indicates the drone-coupled UE to be engaged in the flying state.

18. The method of claim 17, wherein the flying state protocol includes a flying state handover protocol and the non-flying state protocol includes a non-flying state handover protocol.

19. The method of claim 17,
wherein the message indicates that the drone-coupled UE is in the flying state, and
wherein the receiving receives the message while operating in a Connected state with respect to the terrestrial wireless communication subscriber network.

20. The method of claim 17,
wherein the message indicates that the drone-coupled UE is in the flying state, and
wherein the receiving receives the message while operating in an Idle state with respect to the terrestrial wireless communication subscriber network.

21. The method of claim 20,
wherein the flying state handover protocol includes one or more different Tracking Area (TA) parameters relative than the non-flying state handover protocol, or
wherein the flying state handover protocol includes one or more different cell reselection parameters relative than the non-flying state handover protocol, or
any combination thereof.

22. The method of claim 17, wherein the flying state protocol includes:
refusing to admit the drone-coupled UE to the terrestrial wireless communication subscriber network if the drone-coupled UE is unauthorized for drone-coupled service and/or flying state service.

23. The method of claim 17, wherein the flying state protocol includes:
authorizing restricted or limited service to the drone-coupled UE to the terrestrial wireless communication subscriber network if the drone-coupled UE is unauthorized for drone-coupled service and/or flying state service.

24. The method of claim 17, wherein the flying state protocol includes:
authorizing service to the drone-coupled UE while assessing a surcharge to an account of the drone-coupled UE is not subscribed for drone-coupled service and/or flying state service.

25. The method of claim 17, wherein the flying state protocol includes:
implementing a power control scheme for the drone-coupled UE in the flying state that is different from power control schemes used for drone-coupled UEs that are not in the flying state.

26. The method of claim 17, wherein the flying state protocol includes:
implementing a different charging or pricing scheme for the drone-coupled UE in the flying state that is different than charging and/or pricing schemes used for drone-coupled UEs that are not in the flying state.

27. A drone-coupled user equipment (UE), comprising:
a memory; and
at least one processor coupled to the memory and a wireless communications interface and configured to:
determine whether the drone-coupled UE is engaged in a flying state, the drone-coupled UE being associated with a first identifier and a second identifier, the first identifier being associated with the flying state and the second identifier being associated with a non-flying state; and
transmit a message to a network component of a terrestrial wireless communication subscriber network that indicates whether the drone-coupled UE is engaged in the flying state based on the determining, the message including the first identifier to indicate the flying state responsive to determining that the drone-coupled UE is engaged in the flying state, or including the second identifier to indicate the non-flying state responsive to determining that the drone-coupled UE is not engaged in the flying state.

28. A network component of a terrestrial wireless communication subscriber network, comprising:
a memory; and
at least one processor coupled to the memory and at least one communications interface and configured to:
receive a message from a drone-coupled user equipment (UE) that indicates whether the drone-coupled UE is engaged in a flying state, the drone-coupled UE being associated with a first identifier and a second identifier, the first identifier being associated with the flying state and the second identifier being associated with a non-flying state, the message including the first identifier to indicate the flying state responsive to the drone-coupled UE being engaged in the flying state, or including the second identifier to indicate the non-flying state responsive to the drone-coupled UE not being engaged in the flying state.

* * * * *